(12) United States Patent
Kundu et al.

(10) Patent No.: US 11,212,288 B2
(45) Date of Patent: *Dec. 28, 2021

(54) DETECTION AND PREVENTION OF ATTEMPTS TO ACCESS SENSITIVE INFORMATION IN REAL-TIME

(71) Applicant: International Business Machines Corporation, Armonk, NY (US)

(72) Inventors: Ashish Kundu, Elmsford, NY (US); Byung Chul Tak, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/748,922

(22) Filed: Jan. 22, 2020

(65) Prior Publication Data

US 2020/0162469 A1  May 21, 2020

Related U.S. Application Data

(63) Continuation of application No. 15/670,196, filed on Aug. 7, 2017, now Pat. No. 10,581,859.

(51) Int. Cl.
*H04L 29/06* (2006.01)
*H04W 12/08* (2021.01)
*G06F 9/455* (2018.01)

(52) U.S. Cl.
CPC ........ *H04L 63/101* (2013.01); *G06F 9/45558* (2013.01); *H04L 63/1408* (2013.01); *H04W 12/08* (2013.01); *G06F 2009/45587* (2013.01); *H04L 63/0227* (2013.01); *H04L 63/1441* (2013.01); *H04L 63/20* (2013.01)

(58) Field of Classification Search
CPC ... H04L 63/101; H04L 63/14; H04L 63/1408; H04L 63/1441; H04L 63/10–108; H04L 63/08; H04L 63/20; H04L 63/0227; H04W 12/08; G06F 9/45; G06F 9/45558
See application file for complete search history.

(56) References Cited

U.S. PATENT DOCUMENTS

| | | |
|---|---|---|
| 7,458,094 B2 | 11/2008 | Jackson |
| 8,443,440 B2 | 5/2013 | McGee |
| 9,294,507 B1* | 3/2016 | Roth ..................... G06F 21/606 |
| 9,444,808 B1* | 9/2016 | Sherman ................. G06F 21/31 |

(Continued)

FOREIGN PATENT DOCUMENTS

EP  1540832 B1  4/2016

OTHER PUBLICATIONS

"Snort", © 2017 Cisco and/or its affiliates, All rights reserved,8 pages, <https://www.snort.org/>.

(Continued)

*Primary Examiner* — Kristine L Kincaid
*Assistant Examiner* — Shaqueal D Wade-Wright
(74) *Attorney, Agent, or Firm* — Andrew Aubert

(57) ABSTRACT

Embodiments of the present invention provide systems and methods for thwarting attempts at the unauthorized access to the restricted resources within the target server in a multi-node system. Real-time detection of the user ID and thread ID associated with attempts to access the restricted resources within the target server in a multi-node system is achieved by analyzing causality, message queue, and event-driven patterns.

20 Claims, 11 Drawing Sheets

(56) References Cited

U.S. PATENT DOCUMENTS

| | | | |
|---|---|---|---|
| 9,479,528 | B2 | 10/2016 | Deng et al. |
| 9,575,825 | B2 | 2/2017 | Arimilli |
| 9,584,182 | B2 | 2/2017 | Fisher |
| 2008/0016570 | A1 | 1/2008 | Capalik |
| 2010/0077078 | A1 | 3/2010 | Suit |
| 2011/0022812 | A1* | 1/2011 | van der Linden .. H04L 67/1097 711/163 |
| 2011/0239219 | A1 | 9/2011 | Fulton |
| 2011/0246696 | A1 | 10/2011 | Alapati |
| 2013/0159999 | A1 | 6/2013 | Chiueh |
| 2014/0282889 | A1* | 9/2014 | Ishaya ................. H04L 63/0876 726/4 |
| 2014/0317737 | A1 | 10/2014 | Shin |
| 2015/0023494 | A1 | 1/2015 | Fisher |
| 2016/0124780 | A1 | 5/2016 | Scheerer |
| 2016/0179591 | A1 | 6/2016 | Arimilli |
| 2016/0191361 | A1 | 6/2016 | Behera |
| 2017/0061276 | A1 | 3/2017 | Riley |
| 2017/0286673 | A1* | 10/2017 | Lukacs ................... G06F 21/51 |
| 2019/0044945 | A1 | 2/2019 | Kundu et al. |

OTHER PUBLICATIONS

"Suricata", Blog at WordPress.com., 1 page, <https://suricata-ids.org/>.

"Unified Timing-Driven Latch Placement and Cloning Optimization", Printed Jun. 27, 2017, 6 pages.

Attariyan et al., "X-ray: Automating Root-Cause Diagnosis of Performance Anomalies in Production Software", USENIX Association, 10th USENIX Symposium on Operating Systems Design and Implementation (OSOi '12), 14 pages.

Barham et al., "Using Magpie for request extraction and workload modelling", USENIX Association, OSDI '04: 6th Symposium on Operating Systems Design and Implementation, 14 pages.

Chen et al., "Design and Implementation of a Large-Scale Context Fusion Network", Proceedings of the First Annual International Conference on Mobile and Ubiquitous Systems: Networking and Services (MobiQuitous'04), © 2004 IEEE, 10 pages.

Chen et al., "Mapping Algorithm for Coarse-Grained Reconfigurable Multimedia Architectures", 2012 IEEE 26th International Parallel and Distributed Processing Symposium Workshops & PhD Forum, © 2012 IEEE, 6 pages.

Dai et al., "HiTune: Dataflow-Based Performance Analysis for Big Data Cloud", Proceedings of the 2011 USENIX conference on USENIX annual technical conference, Jun. 15-17, 2011, 14 pages.

Denning, Dorothy E. , "An Intrusion-Detection Model", IEEE Transactions 0n Software Engineering, vol. SE-13. N0. 2. Feb. 1987, Manuscript received Dec. 20, 1985; revised Aug. I, 1986, 0098-5589/87/0200-0222 © 1987 IEEE, 11 pages.

Enck et al., "TaintDroid: An Information-Flow Tracking System for Realtime Privacy Monitoring on Smartphones", Conference Paper in ACM Transactions on Computer Systems, Jan. 2010 DOI: 10.1145/2494522, Source: DBLP, ResearchGate, 16 pages.

Fonseca et al. "X-Trace: A Pervasive Network Tracing Framework", Appears in the 4th USENIX Symposium on Networked Systems Design & Implementation (NSDI'07), Apr. 2007, Copyright is retained by the authors, 14 pages.

Gokmen et al. "Acceleration of Deep Neural Network Training with Resistive Cross-Point Devices", IBM T.J. Watson Research Center, Yorktown Heights, NY 10598 USA, Printed Jun. 27, 2017, 19 pages.

Hu et al. "Net-Cohort: Detecting and Managing VM Ensembles in Virtualized Data Centers", ICAC'12, Sep. 18-20, 2012, Copyright 2012 ACM 978-1-4503-1520-3/12/09, 10 pages.

Hurson et al. "Cache Memories for Dataflow Systems", IEEE Parallel & Distributed Technology, 1063-6552/96/ © 1996 IEEE, 15 pages.

Li et al., "Research on Intelligent Intrusion Prevention System Based on Snort", 2010 International Conference on Computer, Mechatronics, Control and Electronic Engineering (CMCE), 10.1109/CMCE.2010.5610483, © 2010 IEEE, 3 pages.

Newsome et al., "Dynamic Taint Analysis for Automatic Detection, Analysis, and Signature Generation of Exploits on Commodity Software", Printed Jun. 27, 2017, 17 pages.

Pan et al., "Causal Event Graphs Cyber-physical System Intrusion Detection System", CSIIRW '12, Oct. 30-Nov. 2, 2012, Copyright 2012, ACM 1-58113-000-0/00/0010, 4 pages.

Provos, Niels, "Improving Host Security with System Call Policies", Proceedings of the 12th USENIX Security Symposium Aug. 4-8, 2003, © 2003 by The USENIX Association All Rights Reserved, 16 pages.

Qin et al., "LIFT: A Low-Overhead Practical Information Flow Tracking System for Detecting Security Attacks", The 39th Annual IEEE/ACM International Symposium on Microarchitecture (MICR0'06), 0-7695-2732-9/06 © 2006 IEEE, Computer Society, 12 pages.

Reynolds et al., "Pip: Detecting the Unexpected in Distributed Systems", NSDI '06: 3rd Symposium on Networked Systems Design & Implementation, USENIX Association, 14 pages.

Sailer et al., "Attestation-based Policy Enforcement for Remote Access", CCS'04, Oct. 25-29, 2004, Washington, DC, USA., Copyright 2004 ACM 1-58113-961-6/04/0010, 10 pages.

Stewart, Kyle E., "Developing a Hybrid Virtualization Platform Design for Cyber Warfare Training and Education", Thesis, Department of the Air Force Air University, AFIT/GCE/ENG/10-06, 111 pages.

Sun et al., "Design and Implementation of an Android Host-based Intrusion Prevention System", ACSAC '14, Dec. 8-12, 2014,Copyright is held by the owner/author(s), Publication rights licensed to ACM, ACM 978-1-4503-3005-3/14/12, 10 pages.

Tak et al. "vPath: Precise Discovery of Request Processing Paths from Black-Box Observations of Thread and Network Activities", Dept. of Computer Science and Engineering, Pennsylvania State University and IBM T.J. Watson Research Center, 25 pages, <Servicehttps://www.usenix.org/legacy/event/usenix09/tech/full_papers/tak/tak_html/>.

Thereska et al., "Stardust: Tracking Activity in a Distributed Storage System", Proceedings of the Joint International Conference on Measurement and Modeling of Computer Systems (SIGMETRICS'06), Jun. 26-30, 2006, 12 pages.

Valeur et al., "A Comprehensive Approach to Intrusion Detection Alert Correlation", IEEE Transactions on Dependable and Secure Computing, vol. 1, No. 3, Jul.-Sep. 2004, Manuscript received Jun. 10, 2004; accepted Aug. 10, 2004, 24 pages.

Wang et al., "A Temporal Data-Mining Approach for Discovering End-to-End Transaction Flows", 2008 IEEE International Conference on Web Services, 978-0-7695-3310-0/08 $25.00 © 2008 IEEE DOI 10.1109/ICWS.2008.59, 8 pages.

Warrender et al. "Detecting Intrusions Using System Calls: Alternative Data Models", Proceedings of the 1999 IEEE Symposium on Security and Privacy, 13 pages.

Xiao et al., "Design and Implementation of Hardware Fusion Technology for Super Sink Node", 2009 International Conference on Networks Security, Wireless Communications and Trusted Computing, 978-0-7695-3610-1/09 © 2009, IEEE DOI 10.1109/NSWCTC.2009.81. 5 Pages.

Xing et al., "SnortFlow: A OpenFlow-based Intrusion Prevention System in Cloud Environment", 2013 Second GENI Research and Educational Experiment Workshop, 978-0-7695-5003-9/13 © 2013 IEEE DOI IO.I 109/GREE.2013.25, 4 pages.

Yong-Sheng et al., "Study on the Multi-pipeline Reconfigurable Computing System", 2008 International Conference on Computer Science and Software Engineering, This work is supported by the Research Foundation of China GAD under grant No. 9140A08020507JW2501, 51308020301, 978-0-7695-3336-0/08 $25.00 © 2008 IEEE DOI 10.1109/CSSE.2008.1068, 4 pages.

IBM Appendix P., "List of IBM Patents or Patent Applications to be Treated as Related", Dated herewith, 2 pages.

* cited by examiner

DETECTION AND PREVENTION OF ATTEMPTS TO ACCESS SENSITIVE INFORMATION IN REAL-TIME

BACKGROUND

The present invention relates generally to the field of computing resource management and more specifically to providing security solutions for a multi-node system.

A server is a computer program or device that provides functionality (i.e., services) for other programs or devices, which are referred to as "clients." This type of setup is known as the client-server model, where a single overall computation is distributed across multiple processes or devices. Some services include sharing data or resources among multiple clients. A single server can serve multiple clients and a single client can use multiple servers. In some instances, a client process may run on the same server device in which the client resides. In other instances, a client process may connect over a network to the server on a different service device from which the client resides.

A virtual machine (VM) is an emulation of a computer system. Virtual machines, which are based on computer architectures, mimic the functionality of a physical computer. VM implementations may involve specialized hardware, software, or a combination of specialized hardware and software. There are different kinds of virtual machines, each with different functions. System VMs (also termed full virtualization VMs) act as a substitute for a real machine by providing functionalities needed to execute entire operating systems. Process VMs are designed to execute computer programs in a platform-independent environment. Some VMs, such as QEMU, are designed to also emulate different architectures while performing the execution of software applications and operating systems written for another CPU or architecture. Operating-system-level (OSL) virtualization allows the resources of a computer to be partitioned via kernel support for multiple isolated user space instances, while physically resembling and feeling like real machines to the end users. OSL virtualization is typically referred to as "containers".

A hypervisor is computer software, firmware, or hardware that creates and runs virtual machines. The hypervisor uses native execution to share and manage hardware. Thus, hypervisor(s) allow for multiple environments which are isolated from one another, yet exist on the same physical machine. Modern hypervisors use hardware-assisted virtualization and virtualization-specific hardware, primarily from the host CPUs. A hypervisor may be referred to as a virtual machine monitor (VMM). A computer on which a hypervisor runs one or more virtual machines is called a host machine. Each virtual machine is called a guest machine. The hypervisor presents the guest operating systems with a virtual operating platform and manages the execution of the guest operating systems. Multiple instances of a variety of operating systems may share the virtualized hardware resources. In contrast, OSL virtualization, (e.g., the containers mentioned above) must share a single kernel. However, the guest operating systems can differ in user space.

Within multi-node server architectures, the node is defined as a unit of hardware with a processor; memory; and internally and externally connected IO devices. Multiple units of such hardware are interconnected with inter-node cables (e.g., SMP cables). Within server architectures, the workloads (i.e., the amount of processing that the computer has been given to do at a given time) can be hosted on a virtualization layer as multiple partitions or as a virtual machine, which is installed directly on hardware rather than within the host operating system (OS). The virtual machine, which is installed directly on hardware rather than within the host operation, is referred to as "bare metal." The "bare metal" has the operating system running directly on top of the hardware portion.

An entity residing in a remote server may attempt to access the sensitive/restricted resources and data of another server (e.g., the target server of the entity residing in the remote server). Such attempts to access sensitive/restricted resources and data residing within the target server are unauthorized. Thus, the unauthorized attempts at accessing the sensitive/restricted resources and data residing within the target server place businesses and other organizations at grave risk of compromising essential information, as contained in the sensitive resources and/or data residing within the target server. Solutions, which can detect and thwart these unauthorized attempts, are of interest to businesses and organizations looking to protect valuable information from unauthorized entities.

SUMMARY

According to one embodiment of the present invention, a method for computer resource management is provided. The method comprises: sending, by one or more processors, a message from a first hypervisor to a second hypervisor through a first type of data and a second type of data; associating, by one or more processors, a thread identification (ID) using the first hypervisor with a user ID on the first hypervisor; associating, by one or more processes, a thread ID using the second hypervisor with a user ID on the second hypervisor; and generating, by one or more processors, metadata, wherein the metadata contains the thread ID associated with the user ID on the first hypervisor and the thread ID associated with the user ID on the second hypervisor.

Another embodiment of the present invention provides a computer program product for computer resource management, based on the method described above.

Another embodiment of the present invention provides a computer system for computer resource management, based on the method described above.

According to an aspect of the present invention, there is a method, computer program product and/or system that performs the following operations (not necessarily in the following order): (i) associating, by one or more processors, a thread identification (ID) using a first hypervisor with information indicative of an identity of a specific user on the first hypervisor; (ii) associating, by the one or more processes, a thread ID using a second hypervisor with information indicative of an identity of a specific user on the second hypervisor; and (iii) generating, by the one or more processors, metadata, wherein the metadata contains the thread ID associated with the information indicative of an identity of a specific user on the first hypervisor and the thread ID associated with the information indicative of an identity of a specific user on the second hypervisor including: (a) piggybacking, by the one or more processors, the information indicative of an identity of a specific user on the first hypervisor, and (b) retrieving, by the one or more processors, the information indicative of an identity of a specific user on the second hypervisor.

DETAILED DESCRIPTION

Figure 1:
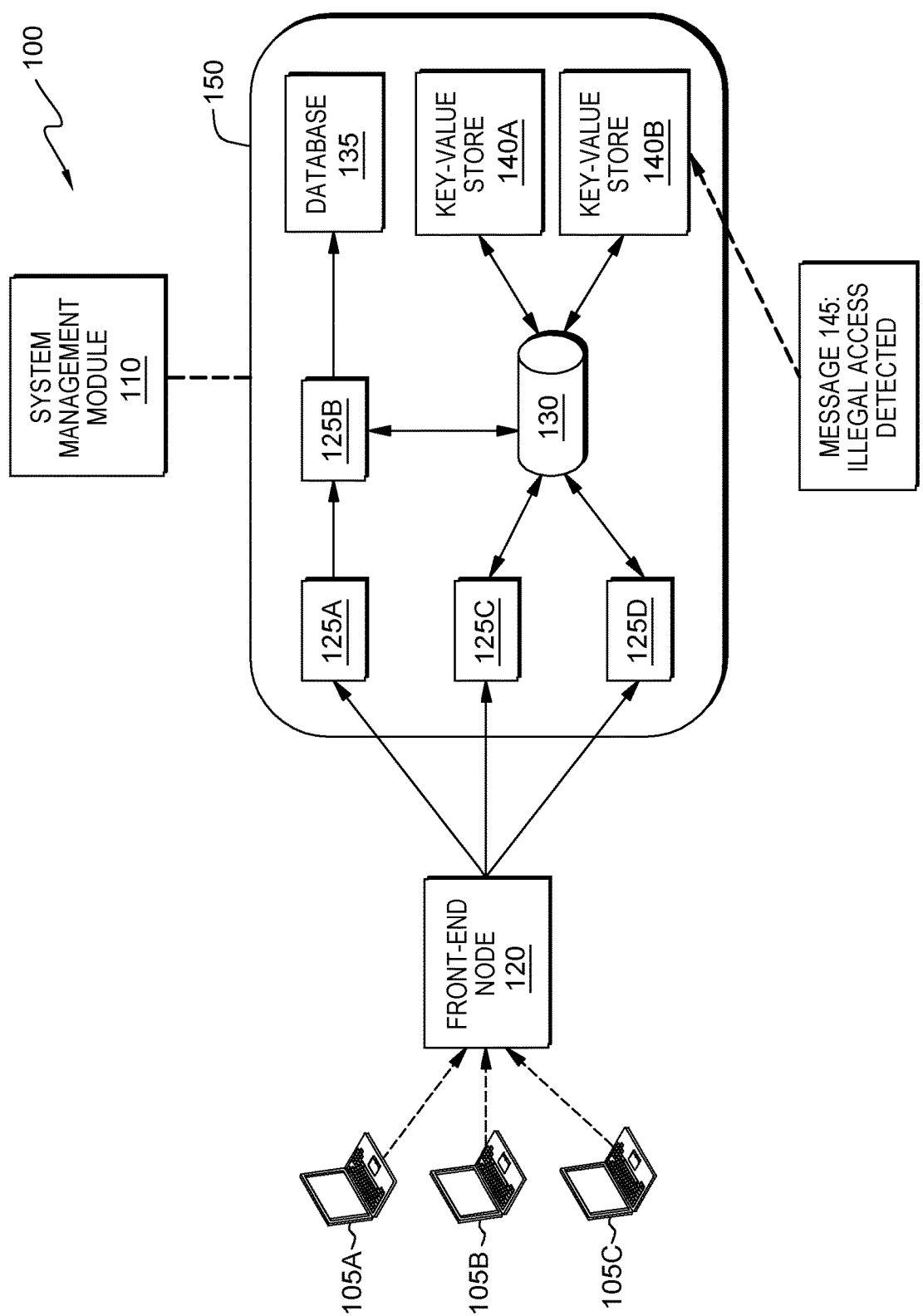
FIG. 1 is a functional block diagram illustrating a data processing environment, in accordance with an embodiment of the present invention.

By simply examining the activities of a target server (i.e., the server containing the sensitive resources and data of value and importance to an organization), the identity of the originating entity (e.g., an end-user of a remote server), which has: (i) originally accessed the restricted resources within the target server and/or (ii) attempted to access restricted resources of the target server, is not clear or apparent. As access requests travel through multiple network hops (e.g., contained within a multi-node system), the originating identity of the entity, which has: (i) actually accessed the restricted resources within the target server and/or (ii) attempted the access to the restricted resources within the target server, becomes diluted. In complex distributed cloud environments (e.g., VM-based environments), end-users send requests to access restricted resources within a target server. The request may travel through many servers before finally reaching a database associated with the target server. However, the database is usually unable to identify the entity which the request actually originated from because the identity of the originating entity is not passed along the route. Therefore, it is not possible to check at the database whether or not the current request for certain data is legitimate and access is authorized to an end-user. For example, the target server can only see access request(s) from the directly connected server but cannot see access request(s) from beyond the directly connected server. Requests that originate from a server which are beyond the directly connected server are examples of a request from a remote server. Furthermore, it is possible that an end-user with malicious intent can: (i) compromise other servers and (ii) use the compromised server to request restricted sensitive data at the database. Stated another way, by virtue of only seeing requests from a directly connected server, the target server is unable to recognize the identity of the originating entity that has: (i) intruded upon the target server; or (ii) attempted the unauthorized access to resources within the target server. The present invention presents methods that detect and prevent unauthorized access attempts in real-time.

More specifically, embodiments of the present invention disclose solutions which: (i) build upon intrusion detection techniques that are applicable to multi-node systems; (ii) detect unauthorized access attempts to sensitive information contained within the target server; and (iii) apply an enhanced network causality tracking technique which traces back across servers and finds the originating entity that has intruded upon the target server or attempted unauthorized access to restricted resources within the target server. The enhanced network causality tracking technique performs tracing functions/activities in real-time, based on the observed thread-level activities at each server of a multi-node system and network communication.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 depicts: (i) hypervisors which run VMs; and (ii) the cooperative system management of hypervisors and the respective VMs by system management module 110.

In an embodiment as depicted in FIG. 1, virtual machines (VMs) are distributed on one or more cloud platforms. A threat model consistent with FIG. 1 includes one or more processes (e.g., processes 105A-C) which are each associated with a virtual machine. A process may or may not have privileges to access one or more resources, wherein each of the one or more resources are associated with a virtual machine (e.g., components 125A-D; message queue 130, database 135, key-value stores 140A-B, and message 145). For the purposes of this disclosure, a "thread" refers to "a thread of execution", which is the smallest sequence of the programmed instructions that can be managed independently by a scheduler (i.e., a method by which specified work is assigned to resources that complete the specified work). Components of data processing environment 100 can be tied to one or more virtual machines. Each of the virtual machines can be on the same or different cloud platform. A security incident arises when a process, among the one or more processes (e.g., processes 105A-C), on a first virtual machine attempts to access a sensitive/restricted resource on the second virtual machine. In other embodiments, there are threat models which are different from the setup of processes 105A-C; components 125A-D; message queue 130; database 135; key-value stores 140A-B; and message 145, as depicted in FIG. 1, which are compatible with system management module 110.

Front-end node 120 is defined as a unit of hardware with a processor; memory; and internally and externally connected IO devices to a multi-node server. Front-end node 120 is a device (e.g., personal computer, cell phone, or printer) or a set of data points on a larger network, which are commonly referred to as "nodes". In a data communication environment, a network node may either be data communication equipment (DCE) such as a modem, hub, bridge or switch; or data terminal equipment (DTE) such as a digital telephone handset, a printer, or a host computer (e.g., router, a workstation, or a server). In an Internet or an Intranet environment, network nodes are host computers (i.e., Internet nodes) identified by an IP address and all hosts are physical network nodes. However, some datalink layer devices such as switches, bridges, and WLAN access points do not have an IP host address (except sometimes for administrative purposes) and are not considered to be Internet nodes or hosts, but as physical network nodes and LAN nodes. Within a "vast" computing environment, the computers on the periphery of a network, end nodes refer to the computers that do not also connect other networks, and the computers that often connect transiently to one or more clouds. A distributed system is a software system in which components located on networked computers communicate and coordinate actions by passing messages where the nodes are clients (i.e., computer hardware or software that accesses a service); servers (i.e., computer program or a machine capable of accepting requests from clients and responding to requests); or peers (i.e., computing or networking which is a distributed application architecture that partitions tasks or workloads between equally privileged and equipotent participants in the distributed application). In an exemplary embodiment, the term "node" refers to a Symmetric Multi-Processing (SMP) node in a multi-drawer server.

System management module 110 performs cooperative system management between all of the hypervisors which run VMs. In an exemplary embodiment, system management module 110 is a separate entity which: (i) resides outside of any hypervisor while coordinating the activities of all of the hypervisors within a system; and (ii) contain a plug-in or extension of a hypervisor. For example, system management module 110 resides in a separate server from the target server which contains the restricted resource. However, system management module 110 communicates with the target server which contains the restricted resource. In an exemplary embodiment, system management module 110 extends into each hypervisor by way of the plug-in. By virtue of system management module 110 extending into each hypervisor by way of the plug-in, system management module 110 obviates the need to change any application or middleware. Furthermore, the extension of system management module 110 into each hypervisor leads to following functionalities and/or characteristics: (i) managing hypervisors, which create and run virtual machine(s); (ii) real-time tracking of request flows which stops the READ function of sensitive data before performing the READ function in large distributed cloud environment without instrumenting any source code; (iii) examining two pieces of information—SEND and RECEIVE (RECV) events; (iv) connecting a SEND event from one server to a RECV event of another server via network metadata annotation (i.e., inter-server connection); (v) connecting a RECV event to a SEND event within a server (i.e., intra-server connection); (vi) observing the RECV and SEND events associated with the thread identity from the hypervisor; (vii) associating the thread identity with RECV/SEND events; (viii) connecting RECV/SEND events with each other; (ix) handling private hypervisor-to-hypervisor message(s) by delivering the user ID between SEND and RECV events; (x) constructing data structure which capture the association of the thread to the USER ID; (xi) generating metadata which holds the user ID; and (xii) sending a message to another hypervisor which notifies the user ID of the incoming message. In other embodiments, there are several other events/information which are variants of SEND and RECV events which may also be leveraged by system management module 110. However, in an exemplary embodiment, SEND and RECV events represent the two pieces of information which are leveraged by system management module 110.

In an exemplary embodiment, component 125A, component 125B, component 125C, and component 125D represent structures which construct a hypervisor managed by system management module 110. In other embodiments, components 125A-D represent other computing structures, such as computing applications. In an exemplary embodiment, all of the applications run inside virtual machines, which are controlled by the hypervisor (which is not explicitly shown in FIG. 1). These virtual machines may reside on the same cloud or different cloud platform as each other. By virtue of system management module 110 managing hypervisors, the applications controlled by the hypervisors are also controlled by system management module 110. For example, system management module 110 instructs which hypervisor will be the target server and which resource, among resource set 150, within the target server will be protected (i.e., the restricted resource as described above).

In an exemplary embodiment, a user interface (which is not explicitly illustrated in FIG. 1) works in conjunction with system management module 110 in order to allow a user to specify information, such as which hypervisor will be the target server and any restricted resources within the target server. Once the user specifies this information, system management module 110 propagates the info to all of hypervisors within a system. Thus, system management module 110 imparts the following capabilities within the target server: (i) real-time detection of attempts to access restricted resources and (ii) denial of unauthorized entities attempting to access the restricted resources. FIG. 1 describes an instance where there is a single target server for the ease of understanding. In other embodiments, a user can specify multiple target servers.

In an exemplary embodiment, system management module 110 can work in conjunction with existing intrusion prevention solutions in order to provide real-time access policy enforcement of sensitive data against an unauthorized remote entity that arrives through distributed hypervisor components (e.g., components 125A, 125B, 125C, and 125D). However, system management module 110 operates differently from the majority of existing data intrusion prevention solutions (which focus on observing network traffic to decide whether to block the network traffic on a single system) by focusing on multi-node systems. In contrast to request (causality) tracking solutions for distributed systems that: (i) perform off-line analysis of collected traces (which prevents real-time prevention of unauthorized access); and (ii) discover the request to access a server flows statistically (which prevents the exact identification of the exact malicious request among multiple access requests), system management module 110 performs real-time analysis and precisely identifies an access request among multiple access requests, respectively. System management module 110 is applied on a multi-node system, as opposed to a single-node system, in order to detect unauthorized attempts to access the terminal node (e.g., the target server which contains the restricted resource) of the multi-node system. In some embodiments, the terminal node is not the target server which contains a restricted resource. Multi-node systems tend to be more complex than a single-node system. In an exemplary embodiment, the multi-node systems become more distributed by virtue of: (i) integrating multiple application components (e.g., components 125A-D) developed by different entities (e.g., multiple end-users including end-users not authorized to access a restricted resource within the target server); and (ii) difficulty in implementing unified mechanisms for tracking access across computing components (e.g., components 125A-D). Furthermore, anomaly, taint-tracking, learning pattern, and mis-use detection techniques (which detect unfamiliar access patterns in order to discover intrusion) are marred by the following: (i) the inability to detect intrusion or unauthorized access attempts to access the terminal node in real-time; and (ii) exhibiting high false positive rates (e.g., deeming an event to be an intrusion when the event is not an intrusion). In contrast to anomaly, taint-tracking, learning pattern, and mis-use detection techniques, the functions and characteristics of system management module 110 lead to: (i) the detection of unauthorized attempt(s) to access the terminal node which originated from other nodes that are multiple hops away from the terminal node in real-time; (ii) the occlusion of unauthorized access to the terminal node (i.e., preventing unauthorized access); and (iii) the reduction of false-positive results.

Process 105A, process 105B, and process 105C are processes (i.e., a dynamic real-time representation of a computing operation or a program that has been executed on virtual machines). In an exemplary embodiment, each process is associated with an entity that is an end-user, wherein each end-user is associated with a virtual machine. For example, process 105A is associated with entity A; process 105B is associated with entity B; and process 105C is associated with entity C. In an exemplary embodiment, processes 105A, B, and C are able to access virtual machines through front-end node 120. Stated another way, entities A-C on processes 105A-C, respectively, can access information contained within virtual machines via front-end node 120. In an exemplary embodiment, not all of the processes are associated with an entity authorized to access one or more resources, wherein each resource is associated with a virtual machine. In this exemplary embodiment, components 125A, 125B, 125C, and 125D are components of the hypervisor which runs a virtual machine. In an exemplary embodiment, components 125A, 125B, and 125C are connected to front-end node 120; component 125A is connected to database 135 via component 125B; and message queue 130 is connected to component 125B, component 125C, component 125D, key-value store 140A, and key-value store 140B. In an exemplary embodiment, database 135 is a structured set of data which can be retrieved by systems management module 110.

Message queue 130 is a queue of messages sent between applications, which includes a sequence of work objects that are waiting to be processed. In this exemplary embodiment, a message is the data transported by system management module 110 and a receiver application, wherein the message is contained within message 145. In the an exemplary embodiment, message queue 130 is connected to: a first resource (e.g., key-value store 140A) which processes 105A, 105B, and 105C have permission to access; and a second resource (e.g., key-value store 140B) which processes 105A and 105C have permission to access. Stated another way, process 105B does not have permission to access key-value store 140B. Process 105B may also be referred to as the "Joker" process that is attempting an unauthorized access to a target server, which contains a restricted resource of interest to the Joker. In an exemplary embodiment, system management module 110 determines that process 105B, which does not have permission to access key-value store 140B (i.e., an unauthorized attempt to access a restricted resource within a target server), is attempting to access key-value store 140B. In response to system management module 110 determining that process 105B is attempting unauthorized access to the restricted resource within a target server via: causality tracking; message queue; and event driven pattern programs (see FIG. 6), system management module 110 sends message 145 to a receiver application, such as a user interface. In this exemplary embodiment, message 145 indicates to an end-user in the user interface that: (i) "illegal access detected" and (ii) the identity of the originating entity (i.e., the process identity of the Joker/process 105B) attempting the unauthorized access to a resource within a virtual machine. Furthermore, by using the causality tracking, message queue, and event driven pattern programs (see FIG. 6), system management module 110 is able to detect and determine the identity of the current process owner is not necessarily the entity (i.e., an end-user) who initiated the attempt to access the restricted resource despite: (i) the service process may be acting on behalf of some other remote end-user; and/or (ii) the command to access the restricted resource may be triggered at some other server.

In an exemplary embodiment, the functions performed by system management module 110 include: (i) handling/private hypervisor-to-hypervisor message(s) for delivering user ID between SEND and RECV events; (ii) constructing a data structure that captures the association of thread to the user ID; (iii) generating the metadata that holds user ID; and (iv) sending the message to another hypervisor which notifies the user ID of the incoming message.

In an exemplary embodiment, system management module 110 works in conjunction with a system which includes: (i) a causality analyzer (e.g., component 125B) that makes use of the thread information which builds a causality tracking path within the software component using only the information collected by the hypervisor; (ii) a message enrichment technique (e.g., component 125C) that works in accordance with the causality analyzer which delivers the user identity across hypervisors; and (iii) a policy enforcer (e.g., component 125D) that decides whether to allow or block the READ system call from returned results.

Figure 2:
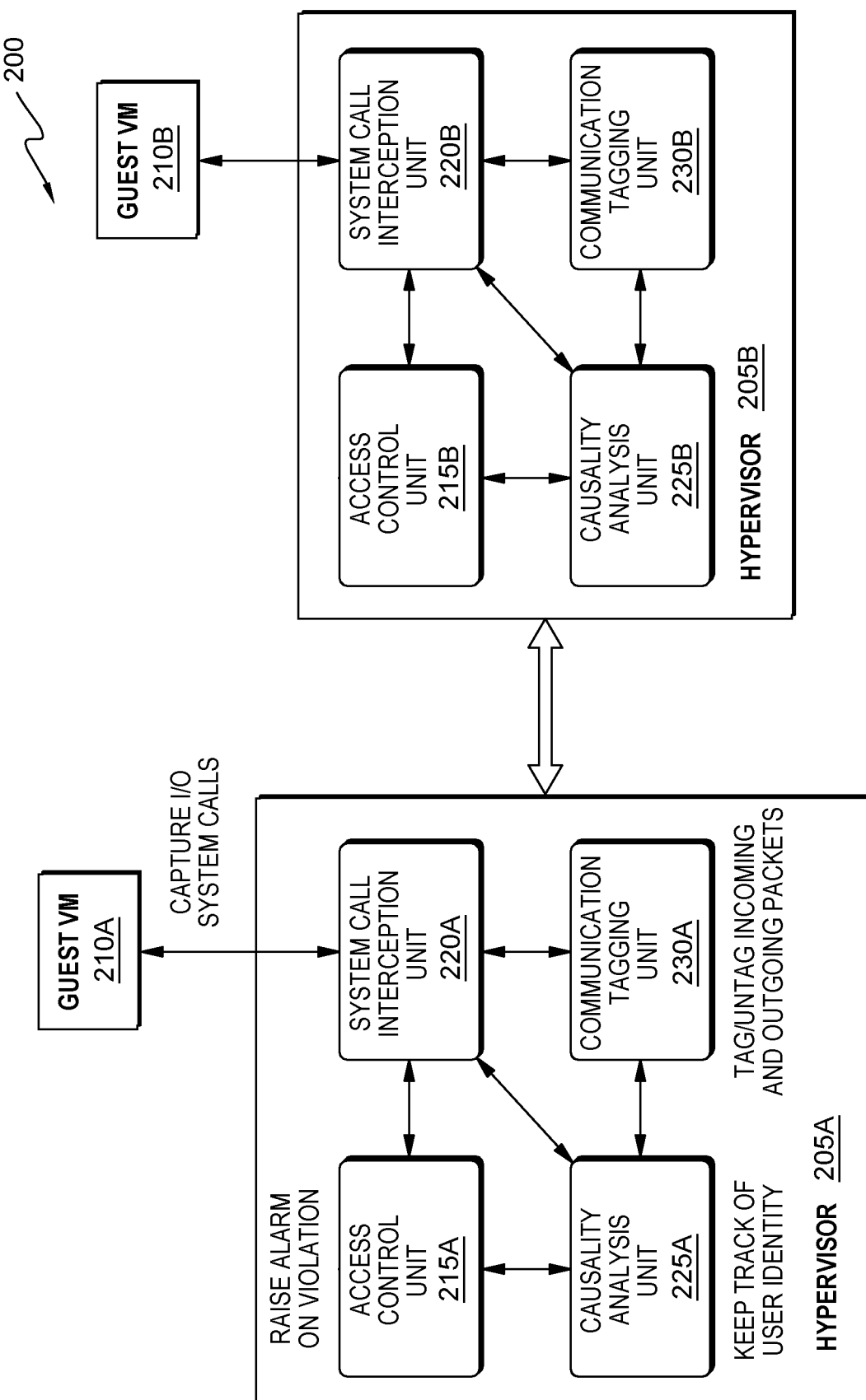
FIG. 2 is a functional block diagram illustrating a multi-node system in terms of virtual machines and hypervisors, in accordance with an embodiment of the present invention.

FIG. 2 is a functional block diagram illustrating a multi-node system in terms of virtual machines and hypervisors in hypervisor-virtual machine environment 200, in accordance with an embodiment of the present invention.

In an exemplary embodiment, there are two hypervisors—hypervisors 205A and 205B—and two virtual machines—guest virtual machine (VM) 210A and guest VM 210B, as illustrated in hypervisor-virtual machine environment 200. Hypervisor 205A is connected to and manages guest VM 210A while hypervisor 205B is connected to and manages guest VM 210B. System call interception unit 220A, communication tagging unit 230A, causality analysis unit 225A, and access control unit 215A are components contained within hypervisor 205A. System call interception unit 220B, communication tagging unit 230B, causality analysis unit 225B, and access control unit 215B are contained within hypervisor 205B. In this exemplary embodiment, hypervisor 205A communicates with hypervisor 205B via non-transitory signals.

In an exemplary embodiment, a VM introspector (e.g., system call interception units 220A-B) is a component of a hypervisor which is in charge of intercepting system calls of all the guest VMs and maintaining those records in the hypervisor's memory for causality analysis in real-time. In an exemplary embodiment, a causality analyzer (e.g., causality analysis units 225A-B) is a component of a hypervisor which analyzes collected system calls and builds mapping of all RECV and SEND system calls to use in the discovery of the (originating) user identity. In an exemplary embodiment, a message enricher (e.g., communication tagging units 230A-B) is a component of a hypervisor which observes all of the incoming/outgoing messages of VMs and adds metadata that indicates the identity of the original requester is. Policy enforcer (e.g., access control units 215A-B) is a component of a hypervisor which is responsible for allowing or disallowing the READ system call based on a configured security policy.

In an exemplary embodiment, the information contained within the metadata is delivered to hypervisor 205A from hypervisor 205B through the message enricher in hypervisor 205B. The configured security policy indicates the conditions and entities which are granted permission to access and not granted permission to access resources on a virtual machine. If the user identity of the thread that issues READ is on the blacklist (i.e., not granted permission to access restricted resources within the target server or virtual machine), system management module 110 changes the system call's return value to −1. Therefore, the entity associated with the user identity of the thread on the blacklist is unable to access restricted resources within the target server or virtual machine.

In an exemplary embodiment, system call interception unit 220A, communication tagging unit 230A, causality analysis unit 225A, and access control unit 215A communicate with each other within hypervisor 205A via non-transitory signals. Similarly, system call interception unit 220B, communication tagging unit 230B, causality analysis unit 225B, and access control unit 215B communicated with each other within hypervisor 205B via non-transitory signals. System call interception units 210A and 210B communicate directly with guest VMs 210A and 210B, respectively, via non-transitory signals. More specifically, system call interception units 210A and 210B capture input/output (I/O) systems calls from guest VMs 210A and 210B, respectively. Access control units 215A and 215B raise an alarm upon detecting unauthorized attempts to access resources residing in guest VMs 210A and 210B, respectively. Causality analysis units 225A and 225B keep track of the user identity of the entity performing unauthorized attempts to access resources residing in guest VMs 210A and 210B, respectively. Communication tagging units 230A and 230B tag/untag incoming and outgoing packets of data associated with thread IDs and user IDs of the entity performing unauthorized attempts to access resources residing in guest VMs 210A and VMs 210B, respectively.

In an exemplary embodiment, end-users do not have access to the units used to construct hypervisor 205A (e.g., system call interception unit 220A, communication tagging unit 230A, causality analysis unit 225A and access control unit 215A) and hypervisor 205B (e.g., system call interception unit 220B, communication tagging unit 230B, causality analysis unit 225B, and access control unit 215B). In an exemplary embodiment, by virtue of these units of the hypervisors and guest VMs 210A and 210B configured as depicted in FIG. 2, system management module 110 achieves real-time detection of an entity, which is unauthorized to access resources residing in guest VMs 210A and 210B. Furthermore, system management module 110 instructs/invokes the units of hypervisors 205A and 205B to:
(i) run programs which associate threads to the identity of the end-user (i.e., the identity of the originating entity attempting unauthorized access to a restricted resource of the target server, such as process 105B in FIG. 1); (ii) propagate this information during network communication; (iii) immediately identify and verify the identity of the originating entity attempting unauthorized access to a restricted resource of the target server; and (iv) raise an alarm and/or deny access to the restricted resource, in response to determining the originating entity attempting to access the restricted resource is not authorized to access the restricted resource.

Figure 3:
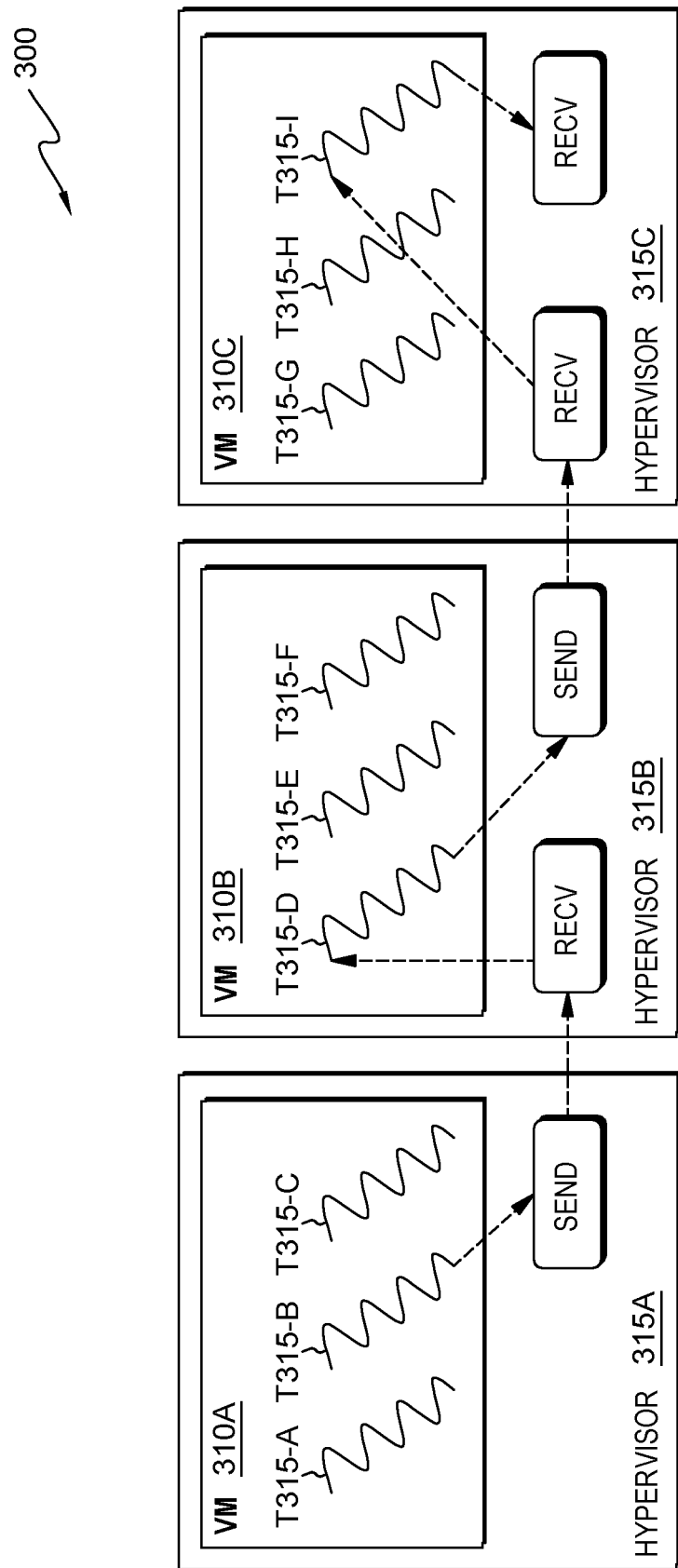
FIG. 3 is a functional block diagram illustrating the propagation of user identities via thread info and network annotation, in accordance with an embodiment of the present invention.

FIG. 3 is a functional block diagram illustrating the propagation of user identities via thread info and network annotation in hypervisor-virtual machine environment 300, in accordance with an embodiment of the present invention.

In an exemplary embodiment, system management module 110 works in conjunction with: (i) hypervisors 315A, 315B, and 315C; and (ii) virtual machines (VMs) 310A, 310B, and 310C which propagates the user identity via thread info and network annotation, as illustrated in hypervisor-virtual machine environment 300. The need to instrument a software stack (i.e., a group of programs that work in tandem to produce a result or achieve a common result) is eliminated by virtue of the configuration of the units of the hypervisors and the VMs, as depicted in FIG. 2. Instead of instrumenting a software stack, system management module 110 performs the following: (i) observing thread activities; and (ii) obtaining the user ID of the originating entity attempting an unauthorized access to a restricted resource (e.g., process 105B in FIG. 1) in real-time before the thread is executed.

In an exemplary embodiment, threads T315-A, T315-B, and T315C reside within the memory of VM 310A, wherein VM 310A is managed by hypervisor 315A; threads T315-D, T315-E, and T315-F reside within the memory of VM 310B, wherein VM 310B is managed by hypervisor 315B; and threads T315-G, T315-H, and T315-I reside within the memory of VM 310C, wherein VM 310C is managed by hypervisor 315C.

In an exemplary embodiment, system management module 110 determines the client address of a thread while annotating RECV and SEND events in combination with the determined client address of the thread. The client address is a client IP address which can be associated a thread ID, wherein each thread ID is an integer value. For the purposes of this disclosure, "annotation" refers to documentation and comments that may be found on code logic. Annotation is typically ignored once the code is executed or compiled. For the purposes of this disclosure, a "thread" is the smallest sequence of programmed instructions that can be managed independently by systems management module 110. Each thread runs independently of and in parallel to the other threads. In an exemplary embodiment, each of the RECV and SEND events on hypervisors 315A, 315B, and 315C must be annotated with additional information.

For example, only thread T315-B, which resides among the two other threads on hypervisor 315A, has a thread ID associated with the client IP address of client@9.4.27.101, which then corresponds to a "SEND" event on hypervisor 315A. The "SEND" event on hypervisor 315A, which derives from (source IP and port, destination IP and port) associated with the client IP address of "client@9.4.27.101", is invoked by systems management module 110 in order to notify hypervisor 315B. The notification of hypervisor 315B is represented by the "SEND" event on hypervisor 315A transforming into the "RECV" event on hypervisor 315B.

Upon detection of the "RECV" event on (source IP and port, destination IP and port) on hypervisor 315B, system management module 110 adds the mapping of thread T315-D to the client IP address of "client@9.4.27.101" (i.e., the same client IP address as thread T315-B). Only thread T315-D, which resides among the two other threads on hypervisor 315B, has a client IP address of "client@9.4.27.101" which corresponds to the "SEND" event on hypervisor 315B. The "Send" event on hypervisor 315B, which derives from (source IP and port, destination IP and port) associated with the client IP address of "client@9.4.27.101", is invoked by systems management module 110 in order to notify hypervisor 315C. Upon detection of the "RECV" event on (source IP and port, destination IP and port) on hypervisor 315C, system management module 110 adds the mapping of thread T315-I to the client IP address of "client@9.4.27.101" (i.e., the same client IP address as threads T315-B and T315-G). Only thread T315-I, which resides among the two other threads on hypervisor 315C, has a client IP address of "client@9.4.27.101" which corresponds to "Annotate SEND" on hypervisor 315C. The "SEND" event on hypervisor 315C, which derives from (source IP and port, destination IP and port) associated with the client IP address of "client@9.4.27.101", is invoked by systems management module 110 in order to determine if a client is authorized or not authorized to access a restricted resource. If a client is not authorized to access a restricted resource, then an "ERROR" message is returned to "RECV" system call. In an exemplary embodiment, the "ERROR" message is displayed within a user interface.

Figure 4:
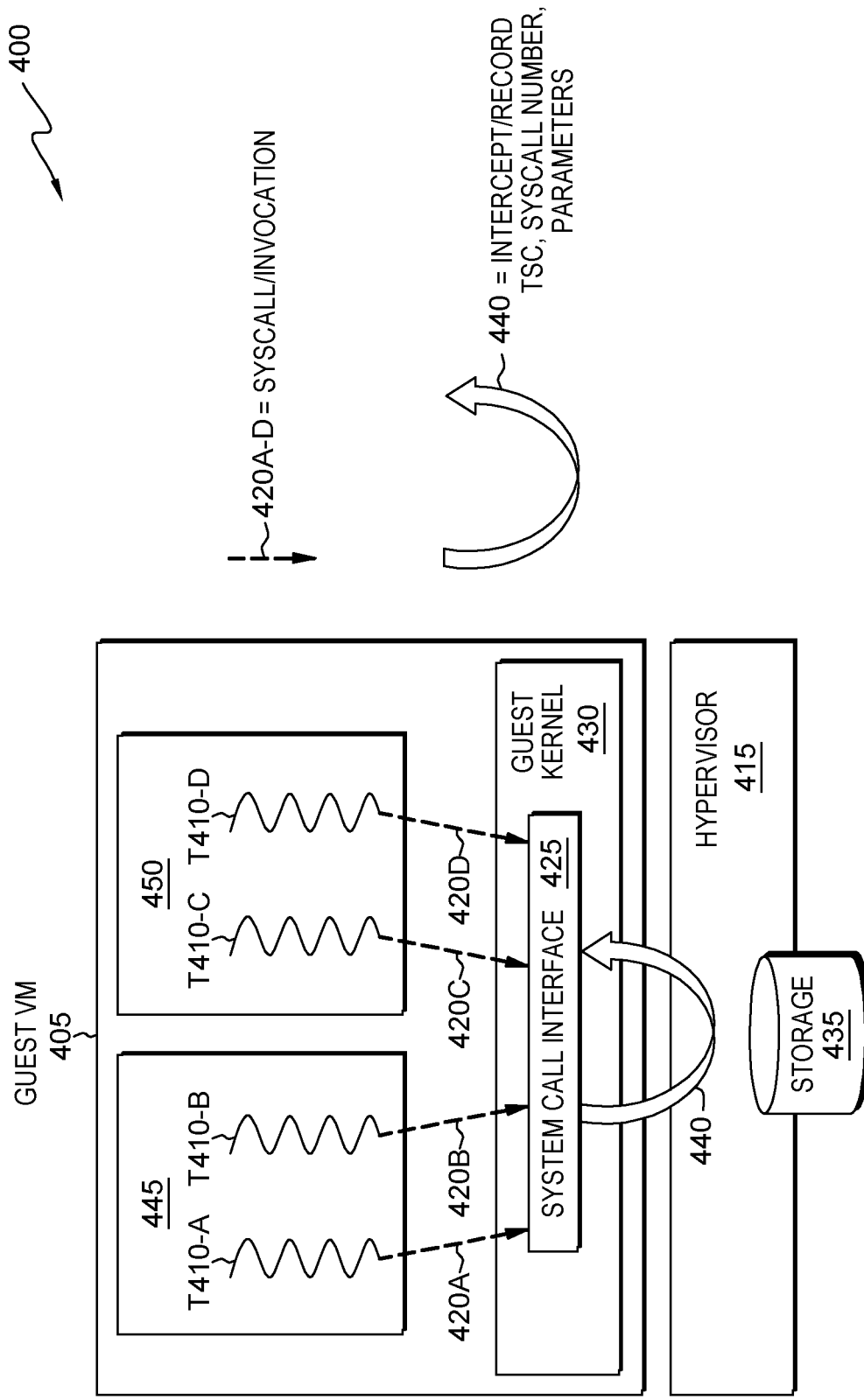
FIG. 4 is a functional block diagram illustrating a virtual machine introspection mechanism, in accordance with an embodiment of the present invention.

FIG. 4 is a functional block diagram illustrating a virtual machine introspection mechanism, in accordance with an embodiment of the present invention.

In an exemplary embodiment, system management module 110 works in conjunction with hypervisor 415, guest virtual machine (VM) 405, and storage 435 in order to implement the virtual machine (VM) introspection mechanism, as illustrated in hypervisor-virtual machine environment 400. The VM introspection mechanism is rendered operable by virtue of system management module 110 working in conjunction with the components of the hypervisors and VMs as depicted in FIG. 2. System management module 110 manages and examines functions 420A-D and function 440, which are performed by guest VM 405 and hypervisor 415. Functions 420A-D represent syscall/invocation functions. Syscall functions refer to "function calling" and invocation functions refer to "function invoking". In an exemplary embodiment, syscall functions occur when an end-user is calling a function in a computer program while invocation functions occur when a function is called automatically. Function 440 represents the interception and recording of time stamp information (TSC register value), system call numbers, parameters, and data buffer contents performed by each hypervisor. The system call numbers, parameters, and data buffer contents derive from syscall and invocation functions.

In an exemplary embodiment, threads T410A-D are stored in the memory of guest VM 405. More specifically, threads T410A and T410B are stored in a different memory structure (e.g. memory 445) from the memory structure (e.g., memory 450) which stores threads T410C and T410D. Additionally, threads T410A-D are associated with processes and therefore, threads T410A-D may be referred to as process threads. Threads 410A-D perform functions 420A-D, respectively, which are intercepted by system call interface 425 on guest kernel 430. There are known techniques for intercepting syscalls and invocations such as: virtualization (i.e., an interface to the VM that does not differ from the underlying hardware); para-virtualization (i.e., an interface to the VM that differs from that of the underlying hardware); kernel-based virtual machine (i.e., a virtualization infrastructure that turns a kernel design into a hypervisor); and Xen (i.e., a hypervisor using a microkernel design that provides services which allow multiple computer operating systems to execute functions on the same computer hardware concurrently). In some embodiments, these known techniques can operate in conjunction with system management module 110, virtual machines, and hypervisors in order to detect unauthorized access attempts to restricted resources on a target server. In an exemplary embodiment, function 440, which originates from system call interface 425 on guest kernel 430, is sent back to system call interface 425 via hypervisor 415. From hypervisor 415, the recorded information contained within function 440 is sent to storage 435.

Figure 5:
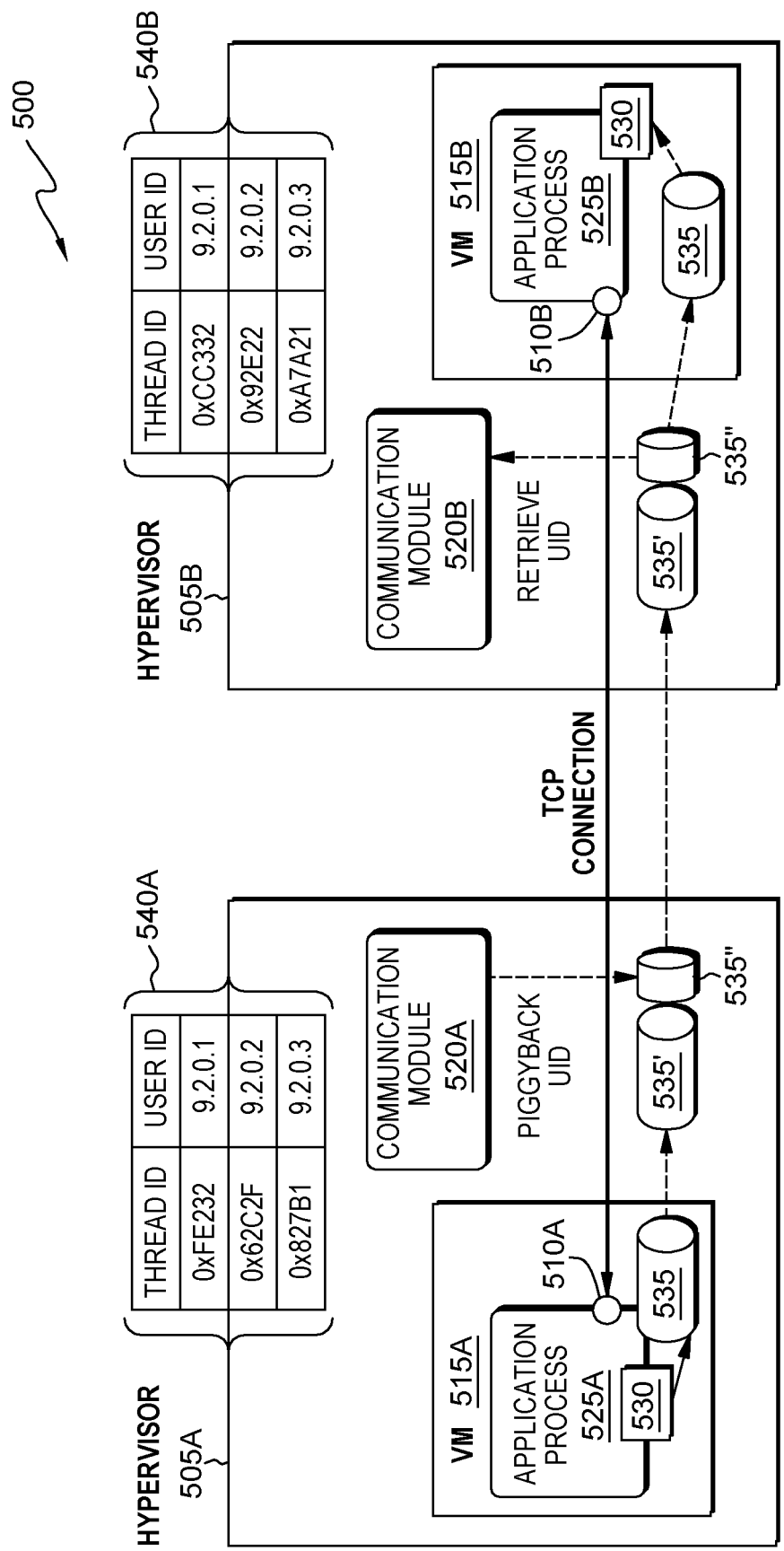
FIG. 5 is a functional block diagram illustrating communications between hypervisors, in accordance with an embodiment of the present invention.

FIG. 5 is a functional block diagram illustrating communications between hypervisors, in accordance with an embodiment of the present invention.

In an exemplary embodiment, system management module 110 works in conjunction with hypervisors 505A-B, virtual machines (VMs) 515A-B, and storage 435 (from FIG. 4) in order to facilitate communications between hypervisor 505A and hypervisor 505B, as illustrated in hypervisor-virtual machine environment 500. Hypervisor 505A runs VM 515A while hypervisor 505B runs VM 515B. Communication module 520A and communication module 520B reside within hypervisor 505A and hypervisor 505B, respectively. Application process 525A and application process 525B reside within VM 515A and VM 515B, respectively. A transmission control protocol (TCP) connection is established between port 510A of VM 515A and port 510B of VM 515B. The communications facilitated between hypervisors can be monitored and examined in real-time by system management module 110. System management module 110 recognizes the identity of entities associated with processes attempting to access resources on a virtual machine (e.g. processes 105A-C) and whether the resources are restricted or not restricted. The IP address is used as the identifier of the USER ID.

In an exemplary embodiment, map 540A and map 540B are maintained by hypervisor 505A and hypervisor 505B, respectively. The THREAD ID and USER ID are contained within Maps 540A-B. For example, the THREAD ID of "0xFE232" is associated with the USER ID of "9.2.0.1" in map 540A; the THREAD ID of "0x62C2F" is associated with the USER ID of "9.2.0.2" in map 540A; the Thread ID of "0x827B1" is associated with the USER ID of "9.2.0.3" in map 540A; the Thread ID of "0xCC332" is associated with the USER ID of "9.2.0.1" in map 540B; the Thread ID of "0x92E22" is associated with the USER ID of "9.2.0.2" in map 540B; and the Thread ID of "0xA7A21" is associated with the USER ID of "9.2.0.3" in map 540C. The THREAD ID and USER ID are updated in real-time by system management module 110.

In an exemplary embodiment, USER ID propagation from hypervisor 505A to hypervisor 505B takes place where message 530 is sent from application process 525A on VM 515A to application process 525B on VM 515B. Message 530 in VM 515A is transferred to packet 535 on VM 515A. The information within packet 535 on VM 515A is transferred to packet 535' on hypervisor 505A. Packet 535' on hypervisor 505A is associated with packet 535" on hypervisor 505A. Packet 535" on hypervisor 505A is an internet protocol (IP) packet payload that contains the USER ID, which is "piggybacked" by communication module 520A.

The function of "piggybacking" occurs when a data frame is received while the receiver waits and does not send the control frame (e.g., an acknowledgement or ACK) back to the sender immediately. The receiver network layer passes in the next data packet which leads to a delayed acknowledgement. The delayed acknowledgement is attached to an outgoing data frame. More specifically, the USER ID from map 540A is sent to communication module 520A by system management module 110, which in turns allows for the piggybacking of the USERID from map 540A to packet 535" on hypervisor 505A. The USER ID information, as contained within packet 535" of hypervisor 505A, is sent to packet 535' of hypervisor 505B. Packet 535' on hypervisor 505A is associated with packet 535" on hypervisor 505B. Packet 535" on hypervisor 505B is an IP packet payload that contains the USER ID, which is retrieved by communication module 520B. The information within packet 535' on hypervisor 505B is transferred to packet 535 on VM 515B. Message 530 in VM 515B is transferred from packet 535 on VM 515B, wherein message 530 in VM 515B derives from message 530 in VM 515A. Furthermore, these events are accompanied by sending separate TCP/IP messages between hypervisor 505A and hypervisor 505B through the TCP connection shared between ports 510A and 510B. In another embodiment, message 530 is sent between hypervisor 505A and hypervisor 505B by sending metadata in private channels (which are not shown in FIG. 5).

Figure 6:
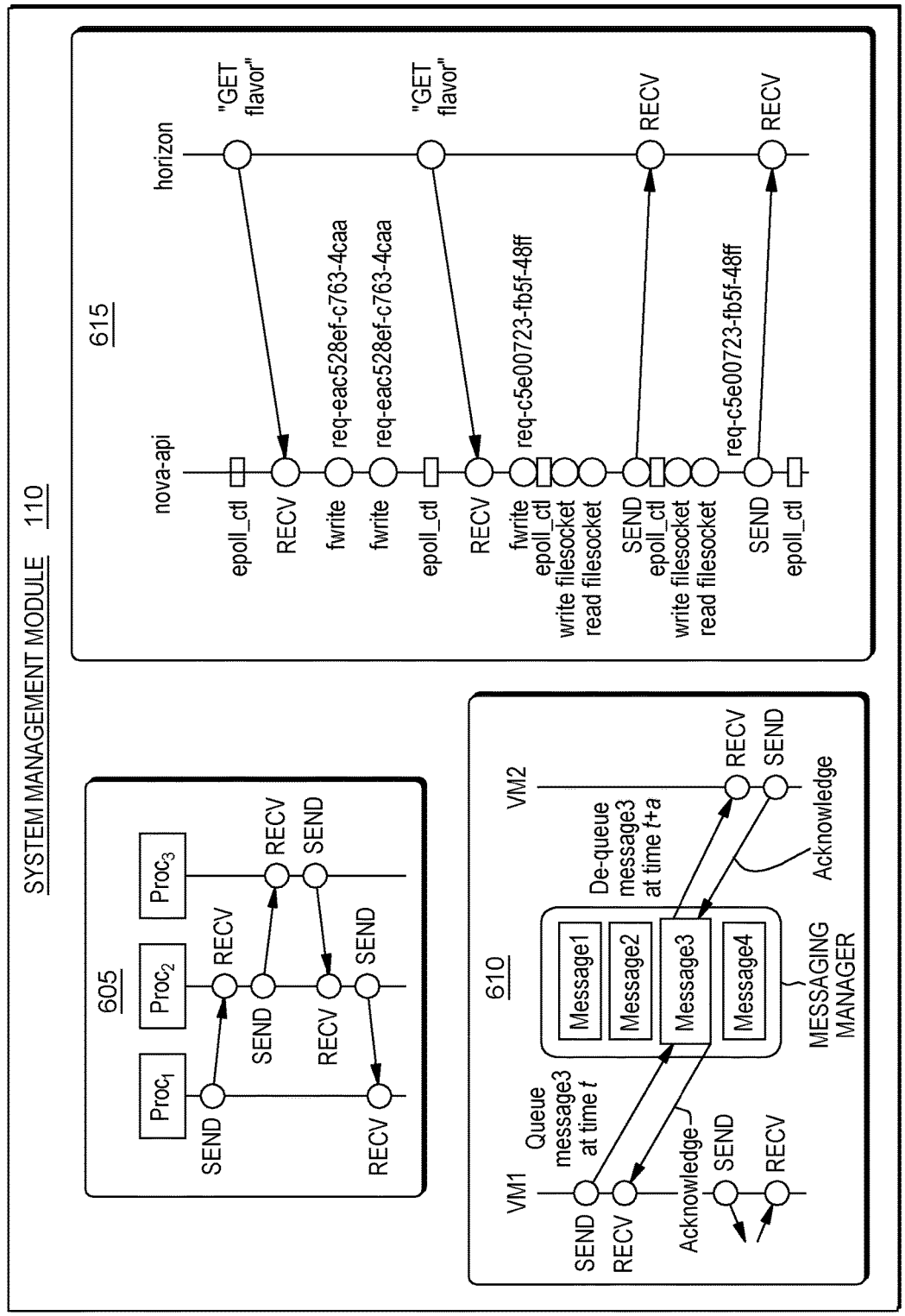
FIG. 6 is a functional block diagram illustrating the real-time causality determination programs in each hypervisor, in accordance with an embodiment of the present invention.

FIG. 6 is a functional block diagram illustrating the real-time causality determination programs in each hypervisor, in accordance with an embodiment of the present invention.

Hypervisor environment 600 is a visual representation of the programs managed by system management module 110 for causality tracking. The programs managed by system management module 110 include: program 605, program 610, and program 615. In some embodiments, these programs are embedded within system management module 110. In other embodiments, these programs reside outside of system management module 110.

In an exemplary embodiment, program 605 represents a base-line causality tracking logic program. As stated above, causality tracking leads to the determination of the originating entity that has intruded upon a target server or attempted unauthorized access to a restricted resource within the target server within real-time. $Proc_1$, $proc_2$, and $proc_3$ are each processes represented as a straight line. SEND and RECV events are associated with a process. By comparing the SEND and RECV events across multiple processes, system management module 110 is able to determine the originating entity within real-time (e.g., an end-user on a remote server and "unauthorized process" such as process 105B in FIG. 2) that has: (i) intruded upon a target server; and (ii) attempted unauthorized access to a restricted resource within the target server. System management module 110 establishes a "base-line" to determine which access attempts correspond to an "authorized process". Deviations from the "baseline", as determined by system management module 110, correspond to an "unauthorized process". $Proc_1$ contains a single unit of the SEND event and a single unit of the RECV; $proc_2$ contains two units of the SEND events and two units of RECV events; and $proc_3$ contains a single unit of the SEND event and a single unit of RECV event. In some embodiment, the contents of the single unit of the SEND event in $proc_1$ is sent to the first of two units of the RECV event in $proc_2$; the contents of the first of two units of the SEND event in $proc_2$ is sent to the single unit of the RECV event in $proc_3$; the contents of the single unit of the SEND event in $proc_3$ is sent to the second of two units of the RECV events in $proc_2$; and the contents of the second of two units of the SEND events in $proc_2$ to the single unit of the RECV event in $proc_1$.

In an exemplary embodiment, program 610 represents a message queue pattern program. VM1 and VM2 are each virtual machines (VMs) represented as a straight line. The SEND and RECV events are associated with a VM. VM1 and VM2 obtain message contents of the SEND and RECV events via interception, as described with respect to FIG. 5. In an exemplary embodiment, system management module 110 invokes program 610 to manage the messages which indicate that unauthorized access has been detected (e.g., message 145 in FIG. 1 and message 530 in FIG. 5) in conjunction with the messaging manager in FIG. 6.

For example, VM1 contains two units of SEND and RECV events while VM2 contains a single unit of a SEND event and a RECV event. The contents of the first of two units of the SEND events of VM1 are transferred to a unit of a RECV event of another virtual machine (that are not explicitly shown in program 610) while the contents of the first of two units of RECV information of VM1 are obtained from a unit of a SEND event of another virtual machine (that are not explicitly shown in program 610). The message manager contains a queue of message1, message2, message3, and message4. The contents of the first of two units of the SEND events are sent to the message queue as message3. In response to message3 on the messaging manager obtaining the contents of the first of the two units of the SEND events on VM1, message3 on the messaging manger queue is queued at time, t. In response to message3 of the messaging manager queue queueing at time t, the first unit of the two units of the RECV events on VM1 acknowledges message3 of the messaging manager has been queued at time, t. The contents of message3 on the messaging manager (queue) are sent to the single unit of the RECV event on VM2. In response to the single unit of the RECV event on VM2 obtaining the contents of message 3 on the messaging manager, message3 on the messaging manager queue is de-queued at time t+a. In response to message3 on the messaging manager de-queueing at time t+a, the single unit of the SEND event on VM2 acknowledges message3 of the messaging manager queue has been de-queued at time t+a. In an exemplary embodiment, THREAD IDs and USER IDs (as described with respect to FIG. 5) are associated with the incoming and outgoing messages in the messaging manager. More specifically, unique ID, msg_ID, req_ID, instance_uuid, and entire messages in JSON code may be associated with incoming and outgoing messages. Furthermore, this information can be extracted from a system calls or library calls, which can be correlated to with SEND/RECV events. System management module 110 builds a causality chain iteration of events using the extracted information correlated with SEND/RECV events. In turn, the causality chain iteration of events leads to the identification of the originating entity attempting to access the restricted resource.

In an exemplary embodiment, program 615 represents an event-driven pattern program. Program 615 is a technique for causality tracking which is applied by system management module 110 in order to determine the originating entity within real-time (e.g., an end-user on a remote server and "unauthorized process" such as process 105B in FIG. 2) that has: (i) intruded upon a target server; and (ii) attempted unauthorized access to a restricted resource in the target server. Program 615 performs the functions of: (i) examining messages for a request ID; (ii) utilizing epoll_ctl as a boundary of thread context change; and (iii) manipulating epoll_create parameter in order to return one event at a time. Program 615 may be referred to as a reconfigured version of the epoll_create parameter.

In an exemplary embodiment, the threads in program 615 are nova-api and horizon threads which are each represented as a straight line. Nova-api and horizon are programs which each contain one or more threads. In other embodiments, other thread containing programs are compatible with program 615. Within the nova-api thread, there are: (i) five units of the epoll_ctl application; (ii) three units of the fwrite syscall/library call; (iii) two units of the RECV event; (iv) two units of the write filesocket syscall/library call; (v) two units of the read filesocket syscall/library call; (vi) and two units of the SEND event. Within the horizon thread, there are: (i) two units of the "GET flavor" commands, which is an example of an operation/action performed on a virtual machine; and (ii) two units of the RECV event. The first unit of the epoll_ctl application and the second unit of the epoll_ctl application of the five units of the epoll_ctl applications form a thread boundary on the nova-api thread which contains: (i) the first of two units of the RECV events; (ii) the first unit of the three units of the fwrite syscall/library call; and (iii) the second unit of the three units of the fwrite syscall/library call. The second unit of the epoll_ctl application and the third unit of the epoll_ctl application of the five units of the epoll_ctl application form a thread boundary on the nova-api thread which contains: (i) the second of the two units of the RECV event; and (ii) the third unit of the three units of fwrite applications. The third unit of the epoll_ctl application and the fourth unit of the epoll_ctl application of the five units of the epoll_ctl application form a thread boundary on the nova-api thread which contains: (i) the first unit of the two write filesocket syscall/library call; (ii) the first unit of the two read filesocket syscall/library call; and (iii) the first of the two units of the SEND event. The fourth unit of the epoll_ctl application and the fifth unit of the epoll_ctl application of the five units of the epoll_ctl application form a thread boundary on the nova-api thread which contains: (i) the second unit of the two write filesocket syscall/library call; (ii) the second unit of the two read filesocket syscall/library call; and (iii) the second of the two units of the SEND event.

For example, the first of two units of the RECV event on the nova-api thread obtains the contents of the first of two "GET flavor" command on the horizon thread, as depicted in program 615. The string ID, as obtained from the first of the two "GET flavor" commands on the horizon thread, is "req-eac528ef-c763-4caa". The ID string of "req-eac528ef-c763-4caa" is processed in the first and second units of the three units of the fwrite syscall/library call. The second of the two units of the RECV event on the nova-api thread obtains the contents of the second of the two "GET flavor" commands on the horizon thread, as depicted in program 615. The string ID, as obtained from the second of two "GET flavor" commands on the horizon thread, is "req-c5e00723-fb5f-48ff". The string ID of "req-c5e00723-fb5f-48ff" is processed in the third of the three units of the fwrite syscall/library call. The first of the two units of the epoll_create application and the second of the two units of the epoll_create application on the horizon thread are manipulated in order to return one event at a given time as "RECV" events in the horizon thread. Each unit of a SEND event is: (i) contained within a thread boundary, which also contains a unit of the write filesocket application and a unit of the read filesocket syscall/library call; and (ii) transferring a unit of the requester ID to a unit of the epoll_create application. For example, the first of two units of the SEND event on the nova-api thread transfers the string ID of "req-eac528ef-c763-4caa" to the first of two units of the RECV events on the horizon thread. The second of two units of the SEND event on the nova-api thread transfers the string ID of "req-c5e00723-fb5f-48ff" to the second of two units of the RECV events on the horizon thread.

Figure 7:
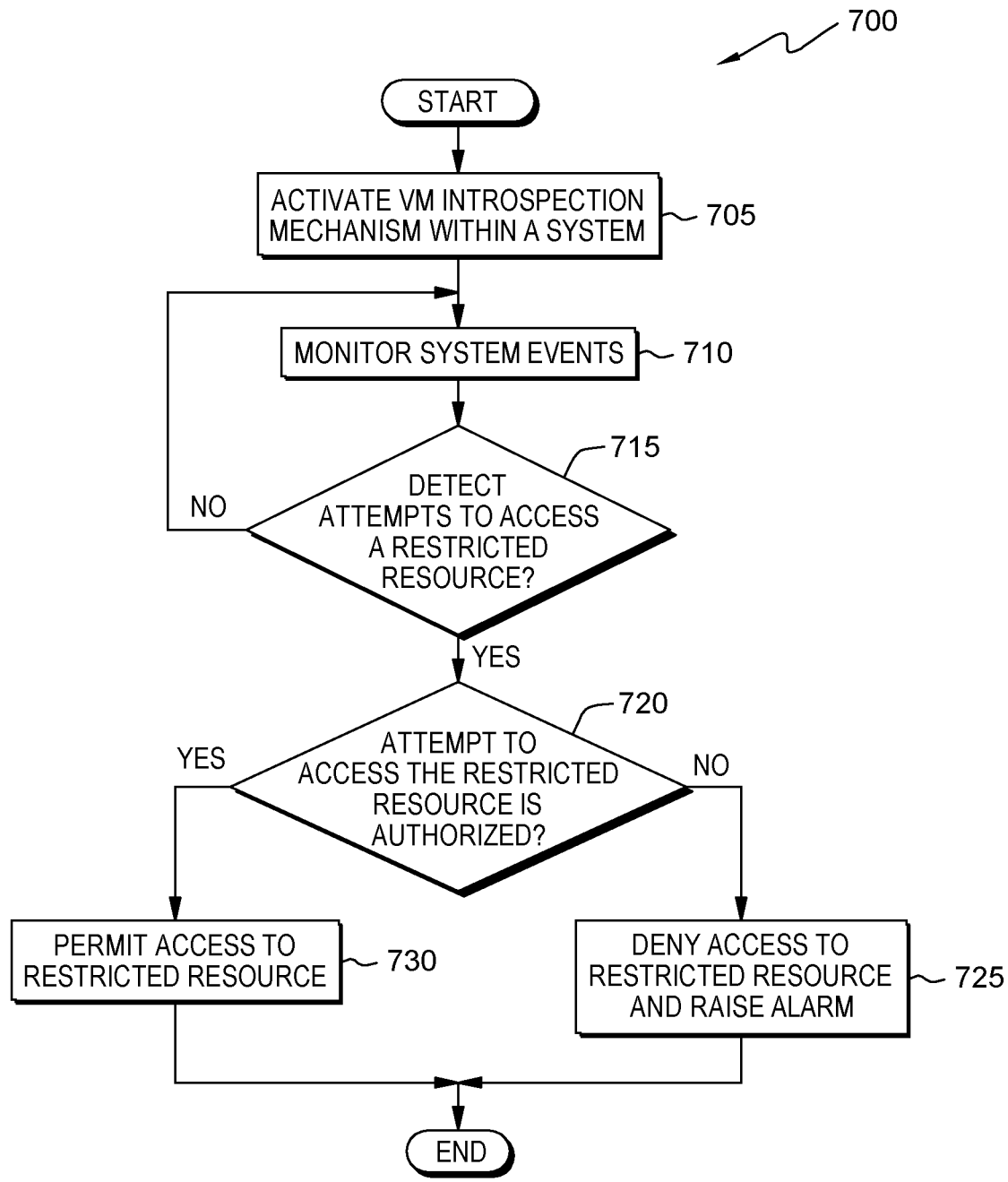
FIG. 7 is a flowchart depicting the operational steps involved in managing hypervisors and virtual machines, in accordance with an embodiment of the present invention.

FIG. 7 is a flowchart depicting the operational steps involved in managing hypervisors and virtual machines, in accordance with an embodiment of the present invention.

In an exemplary embodiment, system management module 110 invokes one or more hypervisors within a computing system, such as data processing environment 100, to perform the operational steps depicted in flowchart 700 by transmitting non-transitory signals.

In step 705, system management module 110 invokes one or more hypervisors to activate the VM introspection mechanism within a system. The VM introspection mechanism that is activated is identical or functionally equivalent to the VM introspection mechanism described with respect to FIG. 4. In response to activating the VM introspection mechanism, the VM introspection mechanism is implemented on a system containing hypervisors and virtual machines that can be managed, monitored, and examined by system management module 110. These systems are identical or functionally equivalent to hypervisors and virtual machines described with respect to FIGS. 1-6.

In step 710, system management module 110 invokes one or more hypervisors to monitor the system. In other words, system management module 110 is tracking the causality of end-user actions across a multi-node distributed system in real-time at the hypervisor level. In an exemplary embodiment, by activating the VM introspection mechanism, system management module 110 is able to monitor events (e.g., system call functions related to network and storage access) occurring within the system through the invoked hypervisor in real-time. FIG. 4 illustrates and describes how the VM introspection mechanism, which is made operable by combining system management module 110 with virtual machines and hypervisors, monitors such events. In an exemplary embodiment, system management module invokes a hypervisor to: (i) run a program that associates the thread to the end-user identity (e.g., the identity of an originating entity attempting to access the restricted resource) as described with respect to FIG. 6 and (ii) propagate the thread associated with the end-user identity information during network communication as described with respect to FIG. 2.

In step 715, system management module 110 detects if there are attempts to access a restricted resource. In an exemplary embodiment, these attempts to access a restricted resource derive from processes associated with an entity, as described with respect to the discussion of processes 105A-C in FIG. 1. The restricted resources within a target server are contained within a system where: (i) the VM introspection mechanism has been activated and (ii) system events have been monitored. If system management module 110 attempts to access a restricted resource, system management module 110 proceeds to step 720 (i.e., the "YES" branch). If system management module 110 does not detect attempts to access a restricted resource, system management module 110 proceeds to step 710 (i.e., the "NO" branch). The hypervisor units described with respect to FIG. 2, the threads described with respect to FIGS. 3-4, and programs described with respect to FIG. 6 are utilized to make the determination of whether or not there are attempts to access a restricted resource. Whenever there are attempts to access the restricted resource at the target server, the identity of the end-user/entity associated with a process is verified. The identity of an end-user/entity associated with a process are associated with a USER ID and THREAD ID as described with respect to FIG. 5.

In step 720, system management module 110 determines whether or not the attempt to access the restricted resource is authorized upon system management module 110 detecting attempts to access the restricted resource. As stated with respect to step 720, the restricted resource within the target server are within a system where: (i) the VM introspection mechanism has been activated and (ii) system events have been monitored. In an exemplary embodiment, the identity of each of the end-users/entities associated with a process have been verified. Thus, system management module 110 is able to determine whether these verified end-users/entities associated with a process are authorized to access the restricted resource within the target server. If system management module 110 determines that the attempts to access the restricted resource is authorized, system management module 110 proceeds to step 730 (i.e., the "YES" branch). If system management module 110 determines that the attempts to access the restricted resource is not authorized, system management module 110 proceeds to step 725 (i.e., the "NO" branch).

In step 725, system management module 110 invokes one or more hypervisors to deny access to the restricted resource and raise an alarm upon system management module 110 determining that the attempt to access the restricted resource is not authorized. In an exemplary embodiment, an unauthorized end-user/entity associated with an unauthorized process (e.g., process 105B in FIG. 1) is denied access to the restricted resource within the target server. A message indicates that an offending party (e.g., an unauthorized end-user/entity associated with an unauthorized process) is attempting to access as restricted resource is an example of "raising an alarm", as described in FIGS. 1, 2, 3, and 5.

In step 730, system management module 110 invokes one or more hypervisors to permit access to the restricted resource upon system management module 110 determining that the attempt to access the restricted resource is authorized. In an exemplary embodiment, the authorized end-user/entity associated with an authorized process (e.g., process 105A and process 105C in FIG. 1) is permitted to access the restricted resource within the target server.

Figure 8:
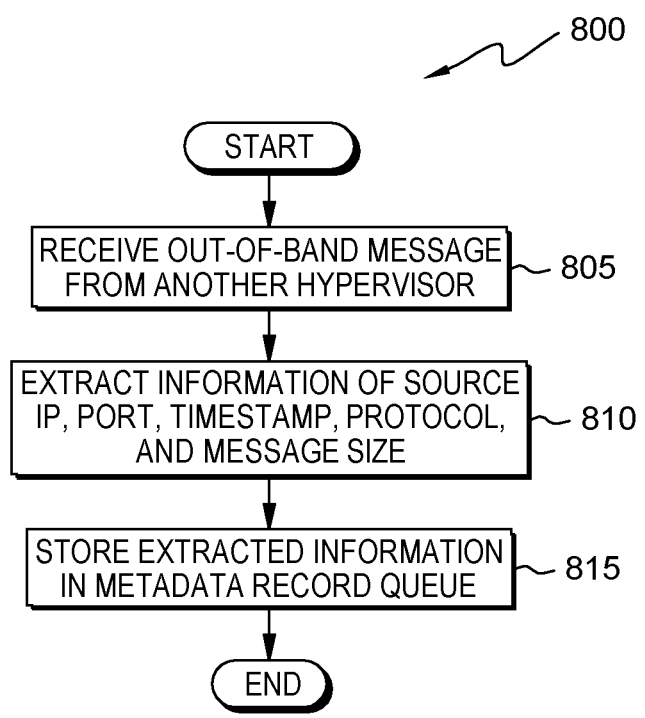
FIG. 8 is a flowchart depicting the operational steps involved in handling out-of-band metadata message(s) from another hypervisor, in accordance with an embodiment of the present invention.

FIG. 8 is a flowchart depicting the operational steps involved in handling out-of-band metadata message(s) from another hypervisor, in accordance with an embodiment of the present invention.

In an exemplary embodiment, system management module 110 invokes one or more hypervisors to perform the operational steps depicted in flowchart 800 by transmitting non-transitory signals. More specifically, system management module 110 invokes a hypervisor to:

Receive an out-of-band message from another hypervisor in step 805;

Extract the information of the source IP, port (e.g., ports 510A and 510B in FIG. 5), timestamp (e.g., function 440 in FIG. 4), protocol, and message size (in terms of amount of memory the message takes up) in step 810; and Storing the extracted information (from step 805) in a metadata record queue (e.g., program 610 in FIG. 6) in step 815.

Figure 9:
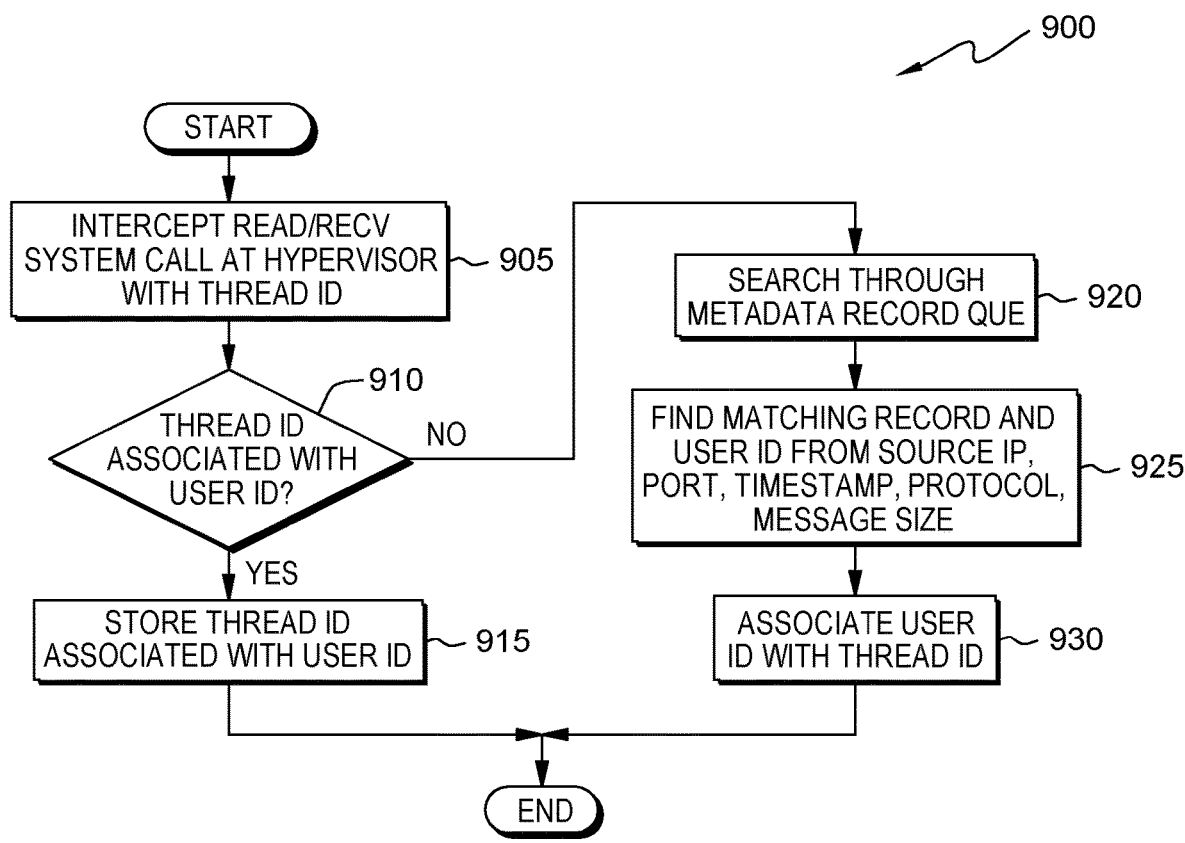
FIG. 9 is a flowchart depicting the operational steps involved in building an association between a thread and user ID, in accordance with an embodiment of the present invention.

FIG. 9 is a flowchart depicting the operational steps involved in building an association between a thread and user ID, in accordance with an embodiment of the present invention.

In an exemplary embodiment, system management module 110 invokes one or more hypervisors to perform the operational steps depicted in flowchart 900 by transmitting non-transitory signals. More specifically, system management module 110 invokes a hypervisor to:

Intercept READ/RECV system calls at a hypervisor with a THREAD ID (e.g., function 440 in FIG. 4 and maps 540A-B in FIG. 5) in step 905;

Determine whether or not the THREAD ID is associated with a USER ID in step 910;

Store the THREAD ID associated with the USER ID (e.g., sending the stored THREAD ID associated with the USERD ID to a database) in step 915, in response to determining that the THREAD ID is associated with the USER ID;

Search through the metadata record que in step 920, in response to determining that the THREAD ID is not associated with the USER ID;

Find the matching record (within the metadata record que from step 915) and USER ID from the source IP, port (e.g., ports 510A and 510B in FIG. 5), timestamp (e.g., function 440 in FIG. 4), protocol, and message size (in terms of amount of memory the message takes up) in step 925; and Associate the USER ID with the THREAD ID in step 930, in response to finding the matching record and USER ID from the source IP, port (e.g., ports 510A and 510B in FIG. 5), timestamp (e.g., function 440 in FIG. 4), protocol, and message size (in terms of amount of memory the message takes up).

Figure 10:
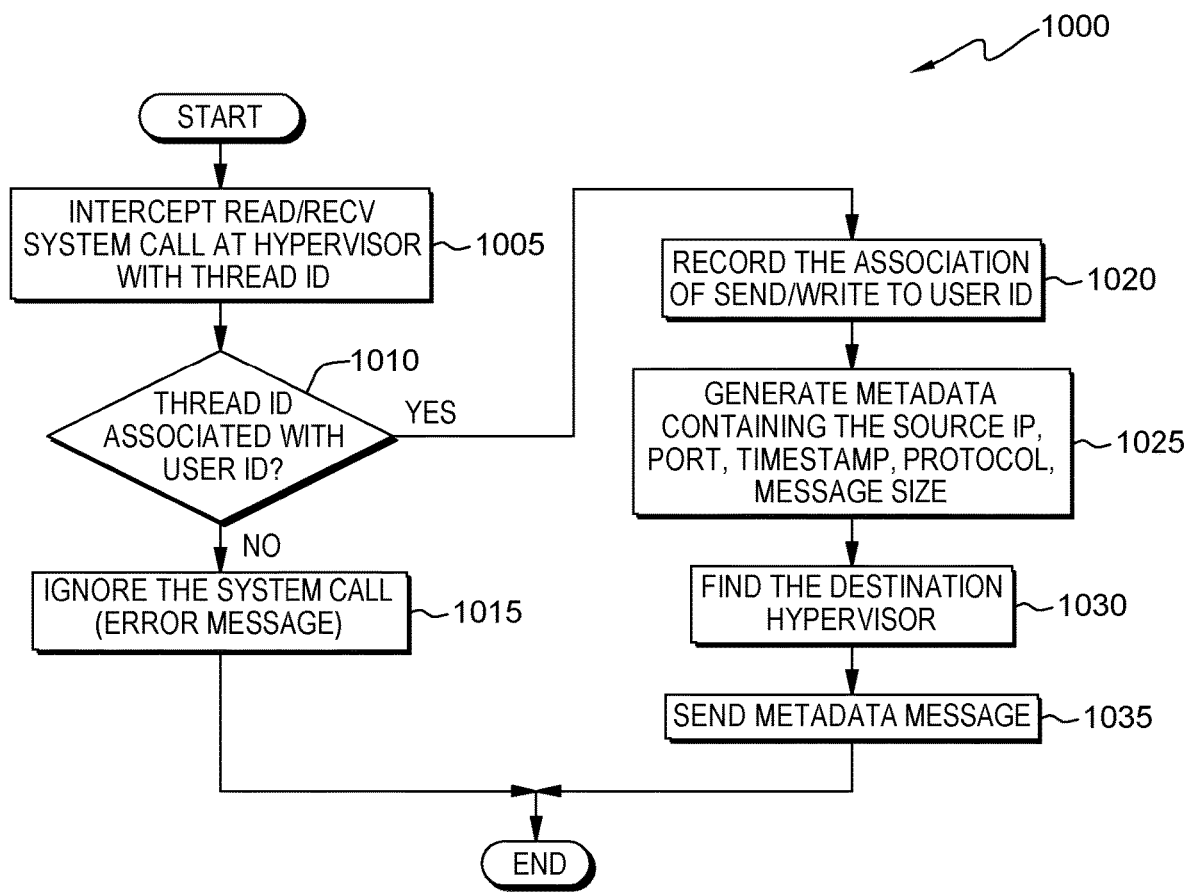
FIG. 10 is a flowchart depicting the operational steps involved in generating metadata message(s) for the destination hypervisor to recognize the user ID of the message, in accordance with an embodiment of the present invention.

FIG. 10 is a flowchart depicting the operational steps involved in generating metadata message(s) for the destination hypervisor to recognize the user ID of the message, in accordance with an embodiment of the present invention.

In an exemplary embodiment, system management module 110 invokes one or more hypervisors to perform the operational steps depicted in flowchart 1000 by non-transitory signals. More specifically, system management module 110 invokes a hypervisor to:

Intercept READ/RECV system calls at a hypervisor with a THREAD ID (e.g., function 440 in FIG. 4 and maps 540A-B in FIG. 5) in step 1005;

Determine whether or not the THREAD ID is associated with a USER ID in step 1010;

Ignore the system call (e.g., functions 420A-D in FIG. 4) and output an error message in step 1015, in response to determining that the THREAD ID is not associated with the USER ID;

Record the association of the send/write application to the USER ID (e.g., program 615 in FIG. 6) in step 1020, in response to determining that the THREAD ID is associated with the USER ID;

Generate the metadata containing the source IP, port (e.g., ports 510A and 510B in FIG. 5), timestamp (e.g., function 440 in FIG. 4), protocol, and message size (in terms of amount of memory the message takes up) in step 1025;

Find the destination hypervisor (which will receive the generated metadata from step 1025) in step 1030; and Send a metadata message to the destination hypervisor (which derives from the generated metadata in step 1025) in step 1030 upon finding the destination hypervisor.

Figure 11:
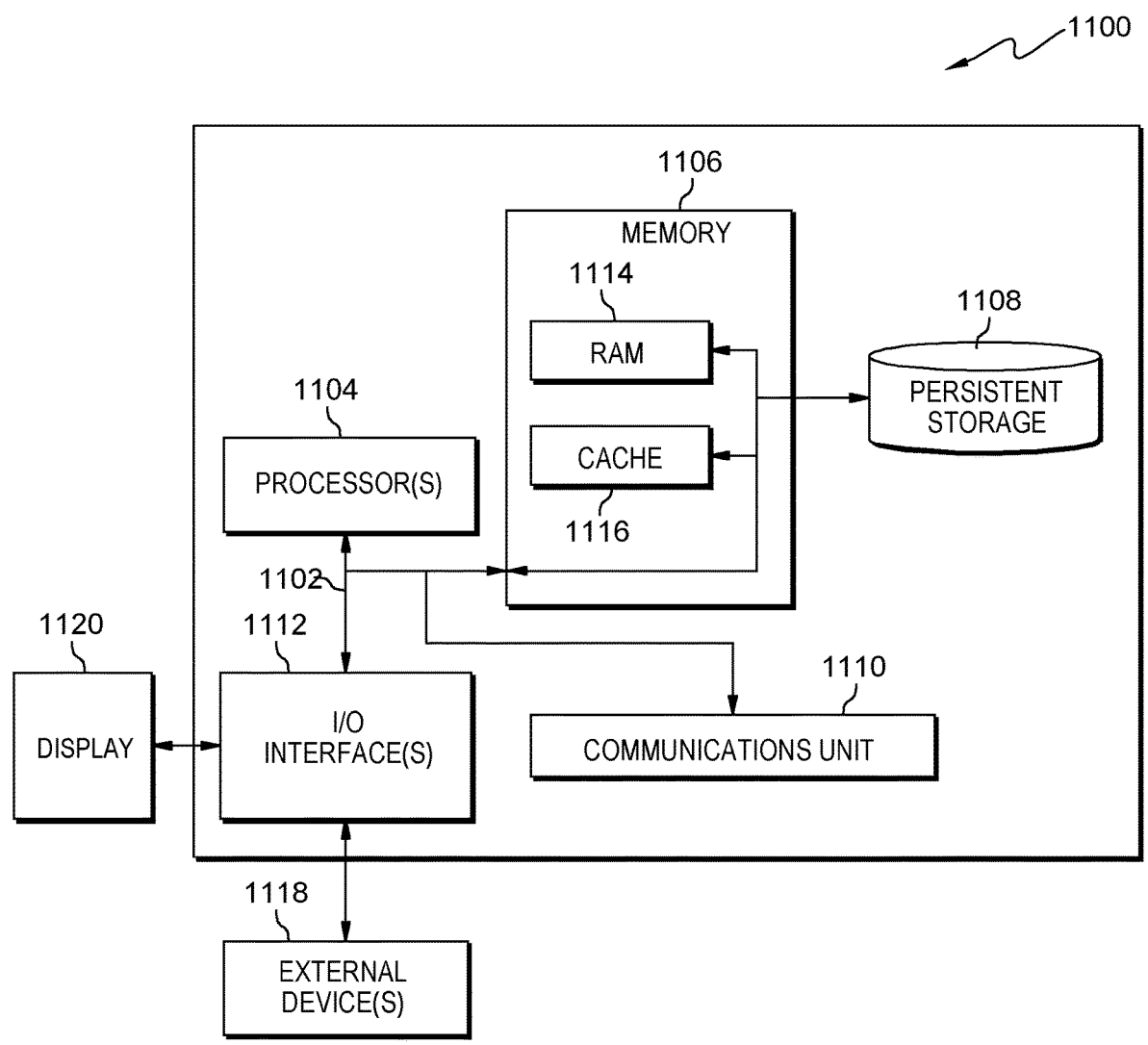
FIG. 11 depicts a block diagram of internal and external components of a computing device, in accordance with an embodiment of the present invention.

FIG. 11 depicts a block diagram of components of a computing device, generally designated 1100, in accordance with an illustrative embodiment of the present invention. It should be appreciated that FIG. 11 provides only an illustration of one implementation and does not imply any limitations with regard to the environments in which different embodiments may be implemented. Many modifications to the depicted environment may be made.

Computing device 1100 includes communications fabric 1102, which provides communications between computer processor(s) 1104, memory 1106, persistent storage 1108, communications unit 1110, and input/output (I/O) interface(s) 1112. Communications fabric 1102 can be implemented with any architecture designed for passing data and/or control information between processors (such as microprocessors, communications and network processors, etc.), system memory, peripheral devices, and any other hardware components within a system. For example, communications fabric 1102 can be implemented with one or more buses.

Memory 1106 and persistent storage 1108 are computer readable storage media. In this embodiment, memory 1106 includes random access memory (RAM) 1114 and cache memory 1116. In general, memory 1106 can include any suitable volatile or non-volatile computer readable storage media.

Program instructions and data used to practice embodiments of the present invention may be stored in persistent storage 1108 for execution and/or access by one or more of the respective computer processors 1104 via one or more memories of memory 1106. In this embodiment, persistent storage 1108 includes a magnetic hard disk drive. Alternatively, or in addition to a magnetic hard disk drive, persistent storage 1108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of persistent storage 1008.

Communications unit 1110, in these examples, provides for communications with other data processing systems or devices. In these examples, communications unit 1110 includes one or more network interface cards. Communications unit 1110 may provide communications through the use of either or both physical and wireless communications links. Program instructions and data used to practice embodiments of the present invention may be downloaded to persistent storage 1108 through communications unit 1110.

I/O interface(s) 1112 allows for input and output of data with other devices that may be connected to computing device 1100. For example, I/O interface 1112 may provide a connection to external devices 1118 such as a keyboard, keypad, a touch screen, and/or some other suitable input device. External devices 1118 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 1108 via I/O interface(s) 1112. I/O interface(s) 1112 also connect to a display 1120.

Display 1120 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    associating, by one or more processors, a thread identification (ID) using a first hypervisor with information indicative of an identity of a specific user on the first hypervisor;
    storing, by the one or more processors, the thread ID using the first hypervisor, in a memory structure within the first hypervisor;
    associating, by the one or more processors, a thread ID using a second hypervisor with information indicative of an identity of a specific user on the second hypervisor; and
    generating, by the one or more processors, metadata, wherein the metadata contains the thread ID associated with the information indicative of an identity of a specific user on the first hypervisor and the thread ID associated with the information indicative of an identity of a specific user on the second hypervisor including:
        piggybacking, by the one or more processors, the information indicative of an identity of a specific user on the first hypervisor, and
        retrieving, by the one or more processors, the information indicative of an identity of a specific user on the second hypervisor.

2. The method of claim 1, wherein:
    the information indicative of an identity of a specific user on the first hypervisor is a user ID;
    the information indicative of an identity of a specific user on the second hypervisor is a user ID;
    the user ID on the first hypervisor is based on an internet protocol (IP) address of a computer device associated with the specific user on the first hypervisor; and
    the user ID on the second hypervisor is based on an internet protocol (IP) address of a computer device associated with the specific user on the second hypervisor.

3. The method of claim 2, further comprising:
    sending, by one or more processors, a message from a first hypervisor to a second hypervisor through a first type of data and a second type of data; and
    annotating, by the one or more processors, the first type of data and the second type of data in response to: (a) associating the thread ID using the first hypervisor with the user ID on the first hypervisor and (b) associating the thread ID using the second hypervisor with the user ID on the second hypervisor.

4. The method of claim 1, further comprising:
    storing, by the one or more processors, the thread ID using the second hypervisor, in a memory structure within the second hypervisor.

5. The method of claim 3, wherein sending from the first hypervisor to the second hypervisor through the first type of data and the second type of data, comprises:
    incorporating, by the one or more processors, the first type of data and the second type of data into a first program, a second program, and a third program.

6. The method of claim 5, further comprising:
    detecting, by the one or more processors, an identity of each process among a plurality of processes in real-time across a multi-node system.

7. The method of claim 5, wherein incorporating the first type of data and the second type of data into the first program, comprises:
    monitoring, by the one or more processors, the first type of data and the second type of data associated with each process among a plurality of processes.

8. The method of claim 5, wherein incorporating the first type of data and the second type of data into the second program, comprises:
queueing, by the one or more processors, messages using the first type of data and the second type of data associated with each virtual machine among a plurality of virtual machines; and
de-queueing, by the one or more processors, messages using the first type of data and the second type of data associated with each virtual machine among a plurality of virtual machines.

9. The method of claim 5, wherein incorporating the first type of data and the second type of data into the third program, comprises:
monitoring, by the one or more processors, the first type of data and the second type of data associated with each thread among a plurality of threads.

10. The method of claim 9, further comprising:
incorporating, by one or more processors, an application on each thread among the plurality of threads;
in response to incorporating the application on each thread among the plurality of threads, creating, by the one or more processors, a thread boundary for each thread among the plurality of threads; and
outputting, by the one or more processors, a single event using the thread boundary for each thread among the plurality of threads.

11. The method of claim 7, further comprising:
verifying, by the one or more processors, an identity of each process among a plurality of processes attempting to access a restricted resource in a target server.

12. The method of claim 11, further comprising:
in response to verifying the identity of each process attempting to access the restricted resource in the target server, denying, by the one or more processors, access to a process not authorized to access the restricted resource in the target server.

13. A computer program product comprising: a computer readable storage medium; and computer code stored on the computer readable storage medium, the computer code including program instructions for causing one or more processors to perform a plurality of operations including the following:
associating, by one or more processors, a thread identification (ID) using a first hypervisor with information indicative of an identity of a specific user on the first hypervisor;
storing, by the one or more processors, the thread ID using the first hypervisor, in a memory structure within the first hypervisor;
associating, by the one or more processors, a thread ID using a second hypervisor with information indicative of an identity of a specific user on the second hypervisor; and
generating, by the one or more processors, metadata, wherein the metadata contains the thread ID associated with the information indicative of an identity of a specific user on the first hypervisor and the thread ID associated with the information indicative of an identity of a specific user on the second hypervisor including:
piggybacking, by the one or more processors, the information indicative of an identity of a specific user on the first hypervisor, and
retrieving, by the one or more processors, the information indicative of an identity of a specific user on the second hypervisor.

14. The computer program product of claim 13, wherein:
the information indicative of an identity of a specific user on the first hypervisor is a user ID;
the information indicative of an identity of a specific user on the second hypervisor is a user ID;
the user ID on the first hypervisor is based on an internet protocol (IP) address of a computer device associated with the specific user on the first hypervisor; and
the user ID on the second hypervisor is based on an internet protocol (IP) address of a computer device associated with the specific user on the second hypervisor.

15. The computer program product of claim 14, wherein the computer code further includes program instructions for causing the one or more processors to perform the following operations:
sending, by one or more processors, a message from a first hypervisor to a second hypervisor through a first type of data and a second type of data; and
annotating, by the one or more processors, the first type of data and the second type of data in response to: (a) associating the thread ID using the first hypervisor with the user ID on the first hypervisor and (b) associating the thread ID using the second hypervisor with the user ID on the second hypervisor.

16. The computer program product of claim 13, wherein the computer code further includes program instructions for causing the one or more processors to perform the following operations:
storing, by the one or more processors, the thread ID using the second hypervisor, in a memory structure within the second hypervisor.

17. A computer system, the computer system comprising:
one or more computer processors;
one or more computer readable storage media;
computer code stored on the computer readable storage medium, the computer code including program instructions for causing one or more processors to perform a plurality of operations including the following:
associating, by one or more processors, a thread identification (ID) using a first hypervisor with information indicative of an identity of a specific user on the first hypervisor,
storing, by the one or more processors, the thread ID using the first hypervisor, in a memory structure within the first hypervisor,
associating, by the one or more processes, a thread ID using a second hypervisor with information indicative of an identity of a specific user on the second hypervisor, and
generating, by the one or more processors, metadata, wherein the metadata contains the thread ID associated with the information indicative of an identity of a specific user on the first hypervisor and the thread ID associated with the information indicative of an identity of a specific user on the second hypervisor including:
piggybacking, by the one or more processors, the information indicative of an identity of a specific user on the first hypervisor, and
retrieving, by the one or more processors, the information indicative of an identity of a specific user on the second hypervisor.

18. The computer system of claim 17, wherein:
the information indicative of an identity of a specific user on the first hypervisor is a user ID;
the information indicative of an identity of a specific user on the second hypervisor is a user ID;

the user ID on the first hypervisor is based on an internet protocol (IP) address of a computer device associated with the specific user on the first hypervisor; and the user ID on the second hypervisor is based on an internet protocol (IP) address of a computer device associated with the specific user on the second hypervisor.

19. The computer system of claim 18, wherein the computer code further includes program instructions for causing the one or more processors to perform the following operations:

sending, by one or more processors, a message from a first hypervisor to a second hypervisor through a first type of data and a second type of data; and annotating, by the one or more processors, the first type of data and the second type of data in response to: (a) associating the thread ID using the first hypervisor with the user ID on the first hypervisor and (b) associating the thread ID using the second hypervisor with the user ID on the second hypervisor.

20. A computer system, the computer system comprising: one or more computer processors; one or more computer readable storage media; computer code stored on the computer readable storage medium, the computer code including program instructions for causing one or more processors to perform a plurality of operations including the following:

associating, by one or more processors, a thread identification (ID) using a first hypervisor with information indicative of an identity of a specific user on the first hypervisor;

storing, by the one or more processors, the thread ID using the first hypervisor, in a memory structure within the first hypervisor;

associating, by the one or more processors, a thread ID using a second hypervisor with information indicative of an identity of a specific user on the second hypervisor; and generating, by the one or more processors, metadata, wherein the metadata contains the thread ID associated with the information indicative of an identity of a specific user on the first hypervisor and the thread ID associated with the information indicative of an identity of a specific user on the second hypervisor including:

piggybacking, by the one or more processors, the information indicative of an identity of a specific user on the first hypervisor, and retrieving, by the one or more processors, the information indicative of an identity of a specific user on the second hypervisor.

* * * * *